(12) United States Patent
Sato et al.

(10) Patent No.: US 9,278,728 B1
(45) Date of Patent: Mar. 8, 2016

(54) BICYCLE SHIFTING CONTROL APPARATUS AND METHOD OF CONTROLLING DERAILLEUR

(71) Applicant: SHIMANO INC., Sakai (JP)

(72) Inventors: Taketoshi Sato, Sakai (JP); Hiroshi Tachibana, Sakai (JP); Kazuhiro Fujii, Sakai (JP); Mao Kuroda, Sakai (JP); Toshinari Ooishi, Sakai (JP); Naohiko Yamada, Sakai (JP)

(73) Assignee: SHIMANO INC., Sakai (JP)

( * ) Notice: Subject to any disclaimer, the term of this patent is extended or adjusted under 35 U.S.C. 154(b) by 16 days.

(21) Appl. No.: 14/527,706

(22) Filed: Oct. 29, 2014

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |
| *B62M 9/122* | (2010.01) |

(52) U.S. Cl.
CPC .................................... *B62M 9/122* (2013.01)

(58) Field of Classification Search
CPC ...... B62M 25/08; B62M 9/122; B62M 25/02; B62M 25/04; B62M 2025/006
USPC ........................................................ 474/78, 80
See application file for complete search history.

(56) References Cited

U.S. PATENT DOCUMENTS

| | | | | |
|---|---|---|---|---|
| 4,889,521 A | * | 12/1989 | Nagano | B62M 9/10 |
| | | | | 474/164 |
| 6,340,338 B1 | * | 1/2002 | Kamada | B62M 9/122 |
| | | | | 474/152 |
| 6,740,003 B2 | * | 5/2004 | Fukuda | B62M 9/122 |
| | | | | 474/80 |
| 7,285,064 B2 | * | 10/2007 | Ichida | B62M 25/02 |
| | | | | 474/80 |

(Continued)

*Primary Examiner* — Henry Liu
(74) *Attorney, Agent, or Firm* — Mori & Ward, LLP

(57) ABSTRACT

A bicycle shifting control apparatus comprises a transmission controller configured to control a guide actuator of a derailleur to move a chain guide of the derailleur between a plurality of shift positions in response to an input shifting signal. The transmission controller is configured to control, in a shifting operation of the chain guide between adjacent two shift positions of the plurality of shift positions, the guide actuator to temporarily decelerate the chain guide at a deceleration position defined between the adjacent two shift positions so that the bicycle chain engages with and/or disengages from one of the sprockets having a shift assist structure prior to completion of the shifting operation of the chain guide.

24 Claims, 20 Drawing Sheets

(56) References Cited

U.S. PATENT DOCUMENTS

| | | | | |
|---|---|---|---|---|
| 7,306,531 B2* | 12/2007 | Ichida | B62M 9/122 | 474/70 |
| 7,547,263 B2* | 6/2009 | Fukuda | B62M 25/08 | 280/260 |
| 7,553,247 B2* | 6/2009 | Guderzo | B62J 99/00 | 280/260 |
| 7,798,929 B2* | 9/2010 | Takamoto | B62M 25/08 | 474/80 |
| 8,025,597 B2* | 9/2011 | Takamoto | B62M 9/122 | 474/70 |
| 8,550,942 B2* | 10/2013 | Oda | B62K 23/06 | 474/80 |
| 8,721,495 B2* | 5/2014 | Kitamura | B62J 6/06 | 474/80 |
| 8,874,338 B2* | 10/2014 | Miglioranza | B62M 9/122 | 180/218 |
| 2004/0005947 A1* | 1/2004 | Shahana | B62M 25/02 | 474/78 |
| 2004/0005948 A1* | 1/2004 | Shahana | B62M 25/02 | 474/78 |
| 2004/0005950 A1* | 1/2004 | Tetsuka | B62M 25/02 | 474/80 |
| 2004/0043850 A1* | 3/2004 | Ichida | B62M 25/02 | 474/70 |
| 2004/0043851 A1* | 3/2004 | Takebayashi | B62M 9/132 | 474/70 |
| 2004/0138017 A1* | 7/2004 | Kitamura | B62M 9/122 | 474/82 |
| 2005/0187049 A1* | 8/2005 | Guderzo | B62M 25/08 | 474/70 |
| 2005/0215369 A1* | 9/2005 | Fukuda | B62M 25/08 | 474/82 |
| 2005/0255950 A1* | 11/2005 | Takebayashi | B62M 25/08 | 474/70 |
| 2006/0122015 A1* | 6/2006 | Takamoto | B62M 25/08 | 474/80 |
| 2006/0189423 A1* | 8/2006 | Ichida | B62M 25/02 | 474/80 |
| 2007/0207885 A1* | 9/2007 | Watarai | B62M 25/08 | 474/70 |
| 2009/0204299 A1* | 8/2009 | Miglioranza | B62M 25/08 | 701/51 |
| 2012/0322591 A1* | 12/2012 | Kitamura | B62J 6/06 | 474/80 |
| 2014/0235383 A1* | 8/2014 | Wesling | F16H 9/06 | 474/80 |
| 2014/0287856 A1* | 9/2014 | Kuwayama | B62M 9/132 | 474/80 |

* cited by examiner

BICYCLE SHIFTING CONTROL APPARATUS AND METHOD OF CONTROLLING DERAILLEUR

BACKGROUND OF THE INVENTION

1. Field of the Invention

The present invention relates to a bicycle shifting control apparatus and a method of controlling a derailleur.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle transmission configured to be electrically operated. Such bicycle transmissions are configured to change a gear position in response to gear shift commands from electric operating devices.

SUMMARY OF THE INVENTION

In accordance with a first aspect of the present invention, a bicycle shifting control apparatus comprises a transmission controller. The transmission controller is configured to control a guide actuator of a derailleur to move a chain guide of the derailleur between a plurality of shift positions in response to an input shifting signal. The chain guide is configured to guide a bicycle chain configured to engage with a sprocket assembly including sprockets having a shift assist structure configured to assist a shifting motion of the bicycle chain. The transmission controller is configured to control, in a shifting operation of the chain guide between adjacent two shift positions of the plurality of shift positions, the guide actuator to temporarily decelerate the chain guide at a deceleration position defined between the adjacent two shift positions so that the bicycle chain engages with and/or disengages from one of the sprockets having the shift assist structure prior to completion of the shifting operation of the chain guide.

In accordance with a second aspect of the present invention, the bicycle shifting control apparatus according to the first aspect is configured so that the deceleration position is defined at a substantially middle position between adjacent two sprockets of the sprocket assembly corresponding to the adjacent two shift positions.

In accordance with a third aspect of the present invention, the bicycle shifting control apparatus according to the first aspect is configured so that the transmission controller is configured to store the deceleration position.

In accordance with a fourth aspect of the present invention, the bicycle shifting control apparatus according to the third aspect is configured so that the transmission controller is configured to store a latest deceleration position inputted from an input device as the deceleration position.

In accordance with a fifth aspect of the present invention, the bicycle shifting control apparatus according to the first aspect is configured so that the transmission controller is configured to store a decelerating time for which the chain guide is temporarily decelerated at the deceleration position in the shifting operation of the chain guide.

In accordance with a sixth aspect of the present invention, the bicycle shifting control apparatus according to the fifth aspect is configured so that the transmission controller is configured to store a latest decelerating time inputted from an input device as the decelerating time.

In accordance with a seventh aspect of the present invention, the bicycle shifting control apparatus according to the first aspect is configured so that the transmission controller is configured to generate a first moving signal to move the chain guide in a first shifting direction, and a second moving signal to move the chain guide in a second shifting direction opposite to the first shifting direction. The transmission controller is configured to generate a temporarily decelerating signal to temporarily decelerate a movement of the chain guide in the first shifting direction and the second shifting direction.

In accordance with an eighth aspect of the present invention, the bicycle shifting control apparatus according to the seventh aspect is configured so that the deceleration position includes a waiting position. The temporarily decelerating signal including a temporarily stopping signal to temporarily stop the chain guide at the waiting position.

In accordance with a ninth aspect of the present invention, the bicycle shifting control apparatus according to the eighth aspect is configured so that the transmission controller is configured to generate one of the first moving signal and the second moving signal in response to one of a first input shifting signal and a second input shifting signal so that the chain guide is moved from one of the adjacent two shift positions to the waiting position. The transmission controller is configured to generate the temporarily stopping signal so that the chain guide is stopped at the waiting position. The transmission controller is configured to generate the one of the first moving signal and the second moving signal so that the chain guide is moved from the waiting position to the other of the adjacent two shift positions.

In accordance with a tenth aspect of the present invention, the bicycle shifting control apparatus according to the ninth aspect is configured so that the transmission controller is configured to generate one of the first moving signal and the second moving signal so that the movement of the chain guide between the waiting position and one of the adjacent two shift positions is equal to the movement of the chain guide between the waiting position and the other of the adjacent two shift positions.

In accordance with an eleventh aspect of the present invention, the bicycle shifting control apparatus according to the ninth aspect is configured so that the transmission controller is configured to generate one of the first moving signal and the second moving signal so that the movement of the chain guide between the waiting position and one of the adjacent two shift positions is different from the movement of the chain guide between the waiting position and the other of the adjacent two shift positions.

In accordance with a twelfth aspect of the present invention, the bicycle shifting control apparatus according to the ninth aspect is configured so that the temporarily stopping signal includes a braking signal to apply a braking force to the chain guide to stop the chain guide at the waiting position.

In accordance with a thirteenth aspect of the present invention, the bicycle shifting control apparatus according to the first aspect is configured so that a distance between the deceleration position and a sprocket of the sprocket assembly corresponding to one of the adjacent two shift positions is shorter than or equal to a half of a distance between adjacent two sprockets of the sprocket assembly corresponding to the other of the adjacent two shift positions.

In accordance with a fourteenth aspect of the present invention, the bicycle shifting control apparatus according to the first aspect is configured so that a distance between the deceleration position and a sprocket of the sprocket assembly corresponding to the one of the adjacent two positions is longer than a half of a distance between adjacent two sprockets of the sprocket assembly corresponding to the adjacent two shift positions.

In accordance with a fifteenth aspect of the present invention, the bicycle shifting control apparatus according to the first aspect is configured so that a clearance between adjacent two sprockets of the sprocket assembly corresponding to the adjacent two shift positions is less than 2.3 mm.

In accordance with a sixteenth aspect of the present invention, the bicycle shifting control apparatus according to the first aspect is configured so that the sprocket assembly includes at least eleven sprockets.

In accordance with a seventeenth aspect of the present invention, a bicycle shifting control apparatus comprises a transmission controller, The transmission controller is configured to control a guide actuator of a derailleur to move a chain guide of the derailleur between a plurality of shift positions in response to an input shifting signal. The chain guide is configured to guide a bicycle chain configured to engage with a sprocket assembly including sprockets having a shift assist structure configured to assist a shifting motion of the bicycle chain. The transmission controller is configured to control, in a shifting operation of the chain guide between adjacent two shift positions of the plurality of shift positions, the guide actuator to temporarily stop the chain guide at a waiting position defined between the adjacent two shift positions so that the bicycle chain engages with and/or disengages from one of the sprockets having the shift assist structure prior to completion of the shifting operation of the chain guide.

In accordance with an eighteenth aspect of the present invention, the bicycle shifting control apparatus according to the seventeenth aspect is configured so that the transmission controller is configured to generate a first moving signal to move the chain guide in a first shifting direction, and a second moving signal to move the chain guide in a second shifting direction opposite to the first shifting direction. The transmission controller is configured to generate a temporarily stopping signal to temporarily stop a movement of the chain guide in the first shifting direction and the second shifting direction.

In accordance with a nineteenth aspect of the present invention, the bicycle shifting control apparatus according to the eighteenth aspect is configured so that the transmission controller is configured to generate one of the first moving signal and the second moving signal in response to one of a first input shifting signal and a second input shifting signal so that the chain guide is moved from one of the adjacent two shift positions to the waiting position. The transmission controller is configured to generate the temporarily stopping signal so that the chain guide is stopped at the waiting position. The transmission controller is configured to generate the one of the first moving signal and the second moving signal so that the chain guide is moved from the waiting position to the other of the adjacent two shift positions.

In accordance with a twentieth aspect of the present invention, the bicycle shifting control apparatus according to the nineteenth aspect is configured so that the transmission controller is configured to generate one of the first moving signal and the second moving signal so that the movement of the chain guide between the waiting position and one of the adjacent two shift positions is equal to the movement of the chain guide between the waiting position and the other of the adjacent two shift positions.

In accordance with a twenty-first aspect of the present invention, the bicycle shifting control apparatus according to the nineteenth aspect is configured so that the transmission controller is configured to generate one of the first moving signal and the second moving signal so that the movement of the chain guide between the waiting position and one of the adjacent two shift positions is different from the movement of the chain guide between the waiting position and the other of the adjacent two shift positions.

In accordance with a twenty-second aspect of the present invention, the bicycle shifting control apparatus according to the nineteenth aspect is configured so that the temporarily stopping signal includes a braking signal to apply a braking force to the chain guide to stop the chain guide at the waiting position.

In accordance with a twenty-third aspect of the present invention, a method of controlling a derailleur comprises: moving a chain guide of the derailleur between a plurality of shift positions in response to an input shifting signal. The chain guide is configured to guide a bicycle chain configured to engage with a sprocket assembly including sprockets having a shift assist structure configured to assist a shifting motion of the bicycle chain; and decelerating the chain guide temporarily, in a shifting operation of the chain guide between adjacent two shift positions of the plurality of shift positions, at a deceleration position defined between the adjacent two shift positions so that the bicycle chain engages with and/or disengages from one of the sprockets having the shift assist structure prior to completion of the shifting operation of the chain guide.

In accordance with a twenty-fourth aspect of the present invention, a method of controlling a derailleur comprises: moving a chain guide of the derailleur between a plurality of shift positions in response to an input shifting signal, the chain guide being configured to guide a bicycle chain configured to engage with a sprocket assembly including sprockets having a shift assist structure configured to assist a shifting motion of the bicycle chain; and stopping the chain guide temporarily, in a shifting operation of the chain guide between adjacent two shift positions of the plurality of shift positions, at a waiting position defined between the adjacent two shift positions so that the bicycle chain engages with and/or disengages from one of the sprockets having the shift assist structure prior to completion of the shifting operation of the chain guide.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
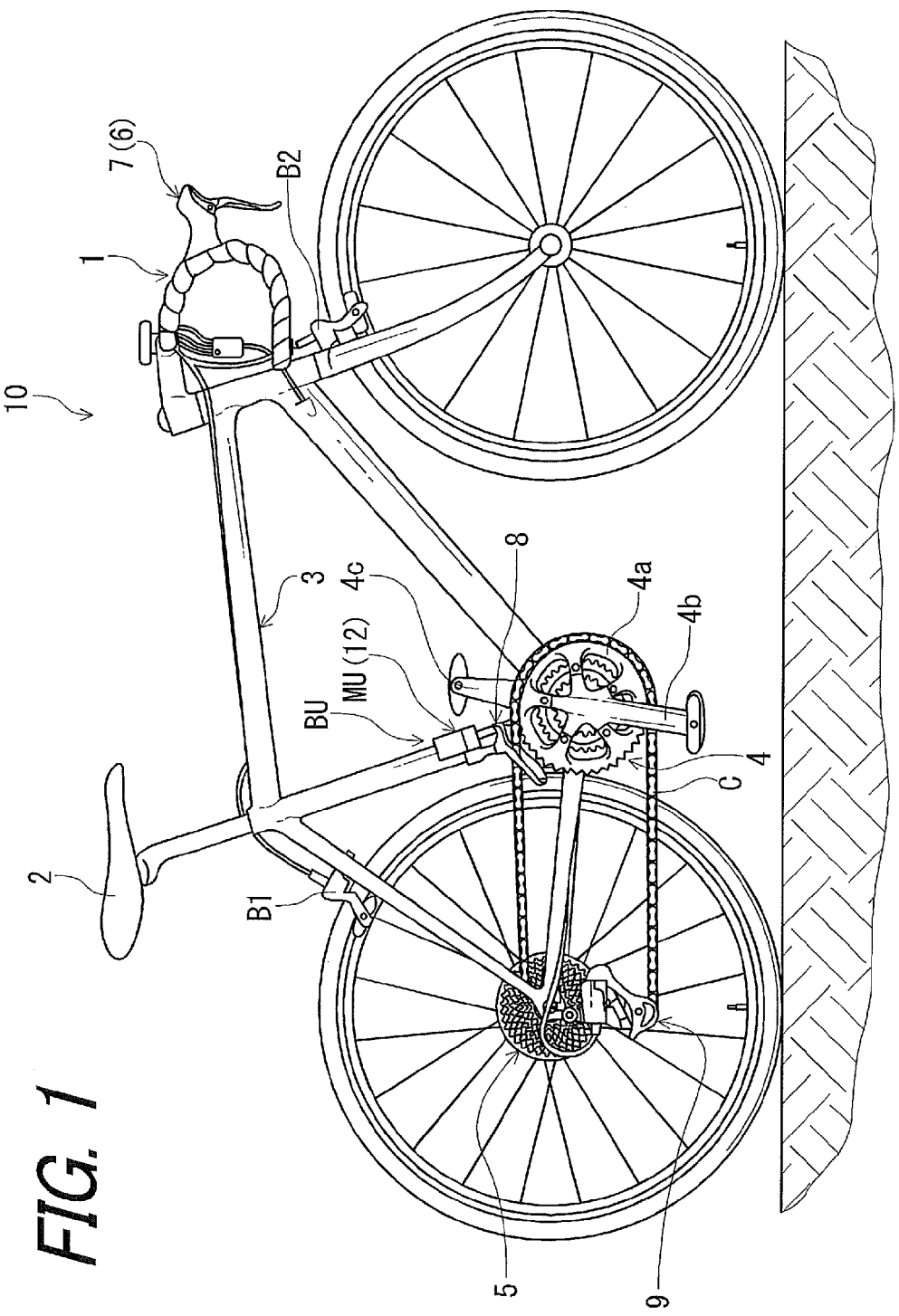
FIG. 1 is a side elevational view of a bicycle provided with a bicycle shifting control apparatus in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 is illustrated that is equipped with a bicycle shifting control apparatus 12 in accordance with a first embodiment. While the bicycle 10 is illustrated as a road bike, the bicycle shifting control apparatus 12 can be applied to mountain bikes or any type of bicycle.

As seen in FIG. 1, the bicycle 10 includes a handlebar 1, a saddle 2, a bicycle frame 3, a crank assembly 4, a rear sprocket assembly 5, a front shifter 6, a rear shifter 7, an electric (motorized) front derailleur 8, and an electric (motorized) rear derailleur 9. A bicycle chain C engages with a chain wheel 4a of the crank assembly 4 and the rear sprocket assembly 5. The electric front derailleur 8 is configured to shift the bicycle chain C between a plurality of front gear positions in response to operation of the front shifter 6. The electric rear derailleur 9 is configured to shift the bicycle chain C between a plurality of rear gear positions in response to operation of the rear shifter 7. The front shifter 6 is integrated in a left-side operating device via which a user operates a rear braking device B1. The rear shifter 7 is integrated in a right-side operating device via which a user operates a front braking device B2.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on the saddle 2 of the bicycle 10 with facing the handlebar 1. Accordingly, these terms, as utilized to describe bicycle components, should be interpreted relative to the bicycle 10 equipped with the bicycle components as used in an upright riding position on a horizontal surface.

The bicycle 10 includes a battery unit BU and a master unit MU. The battery unit BU and the master unit MU are mounted on the bicycle frame 3. The battery unit BU is configured to supply electrical power to several electric components such as the master unit MU, the electric front derailleur 8, and the electric rear derailleur 9. The master unit MU is configured to control several electric components. In the illustrated embodiment, the bicycle shifting control apparatus 12 is mounted in the master unit MU. However, the bicycle shifting control apparatus 12 can be at least partially mounted in other electric components such as the front shifter 6, the rear shifter 7, the electric front derailleur 8, and the electric rear derailleur 9 if needed and/or desired.

In the illustrated embodiment, the bicycle shifting control apparatus 12 will be described below in detail using the rear sprocket assembly 5, the rear shifter 7, and the electric rear derailleur 9. The rear sprocket assembly 5 can be hereinafter referred to as a sprocket assembly 5. The rear shifter 7 can be hereinafter referred to as a shifter 7. The electric rear derailleur 9 can be hereinafter referred to as a derailleur 9.

Figure 2:
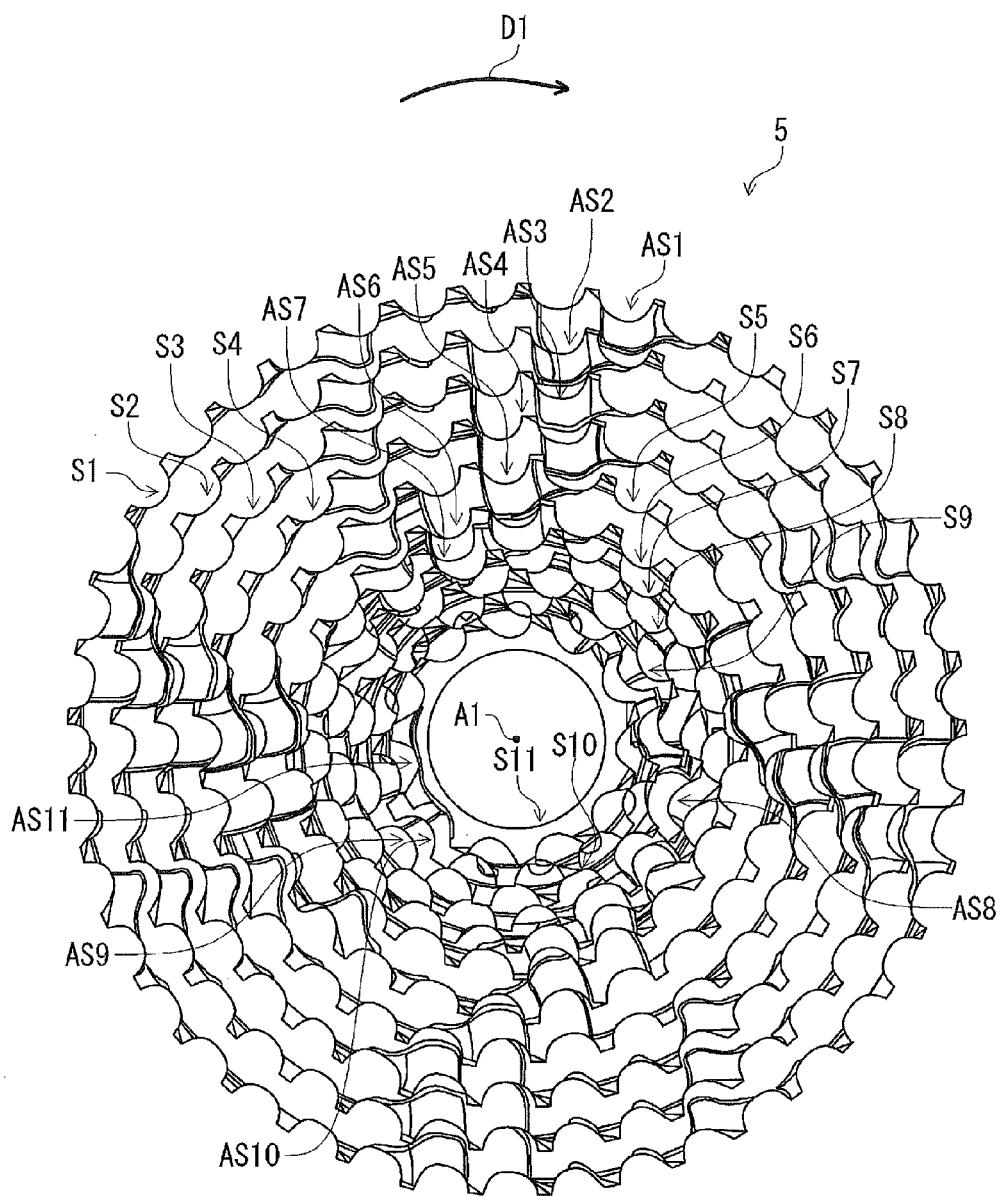
FIG. 2 is a side elevational view of a sprocket assembly of the bicycle illustrated in FIG. 1.

As seen in FIG. 2, the sprocket assembly 5 has a rotational center axis A1 and is rotatable about the rotational center axis A1 in a rotational driving direction D1. The sprocket assembly 5 includes sprockets. The sprocket assembly 5 preferably includes at least eleven sprockets. However, the sprocket assembly 5 can include at least two sprockets. In the illustrated embodiment, the sprocket assembly 5 includes first to eleventh sprockets S1 to S11. The first sprocket S1 has a largest outer diameter in the sprocket assembly 5. The eleventh sprocket S11 has a smallest outer diameter in the sprocket assembly 5. The first to eleventh sprockets S1 to S11 is also referred to as the sprockets S1 to S11.

Figure 3:
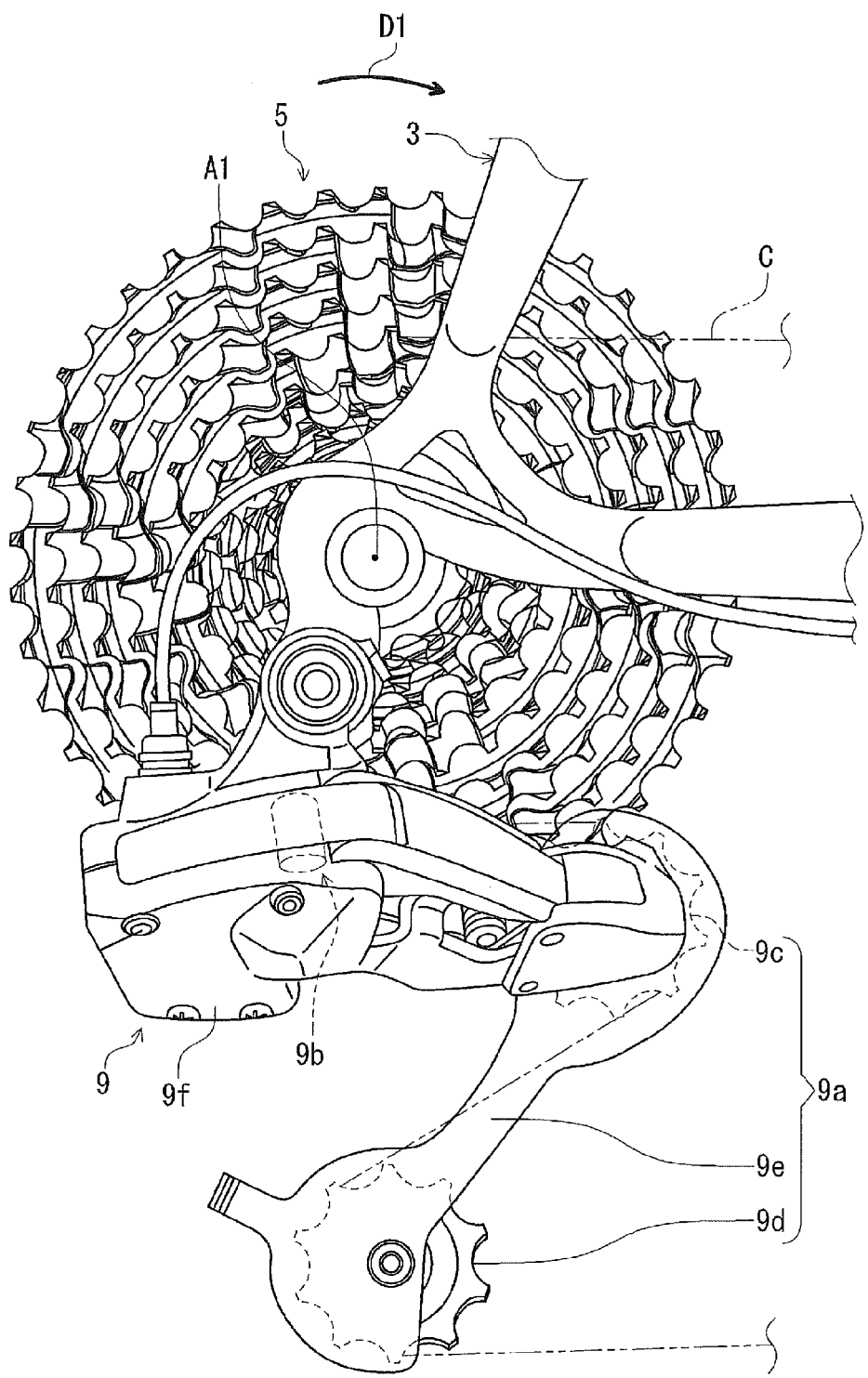
FIG. 3 is a side elevational view of the sprocket assembly and a derailleur of the bicycle illustrated in FIG. 1.

As seen in FIG. 3, the derailleur 9 includes a chain guide 9a and a guide actuator 9b. The chain guide 9a includes a guide pulley 9c, a tension pulley 9d, and a pair of guide plates 9e. The guide pulley 9c is configured to engage with the bicycle chain C. The guide pulley 9c is rotatably mounted to the pair of guide plates 9e. The tension pulley 9d is configured to engage with the bicycle chain C. The tension pulley 9d is rotatably mounted to the pair of guide plates 9e. The pair of guide plates 9e is movably mounted to a housing 9f secured to the bicycle frame 3. The guide actuator 9b is provided in the housing 9f. The guide actuator 9b is configured to move the chain guide 9a relative to the housing 9f via the pair of guide plates 9e. Since the derailleur 9 includes structures known in the bicycle field, they will not be described and/or illustrated in detail here for the sake of brevity.

Figure 4:
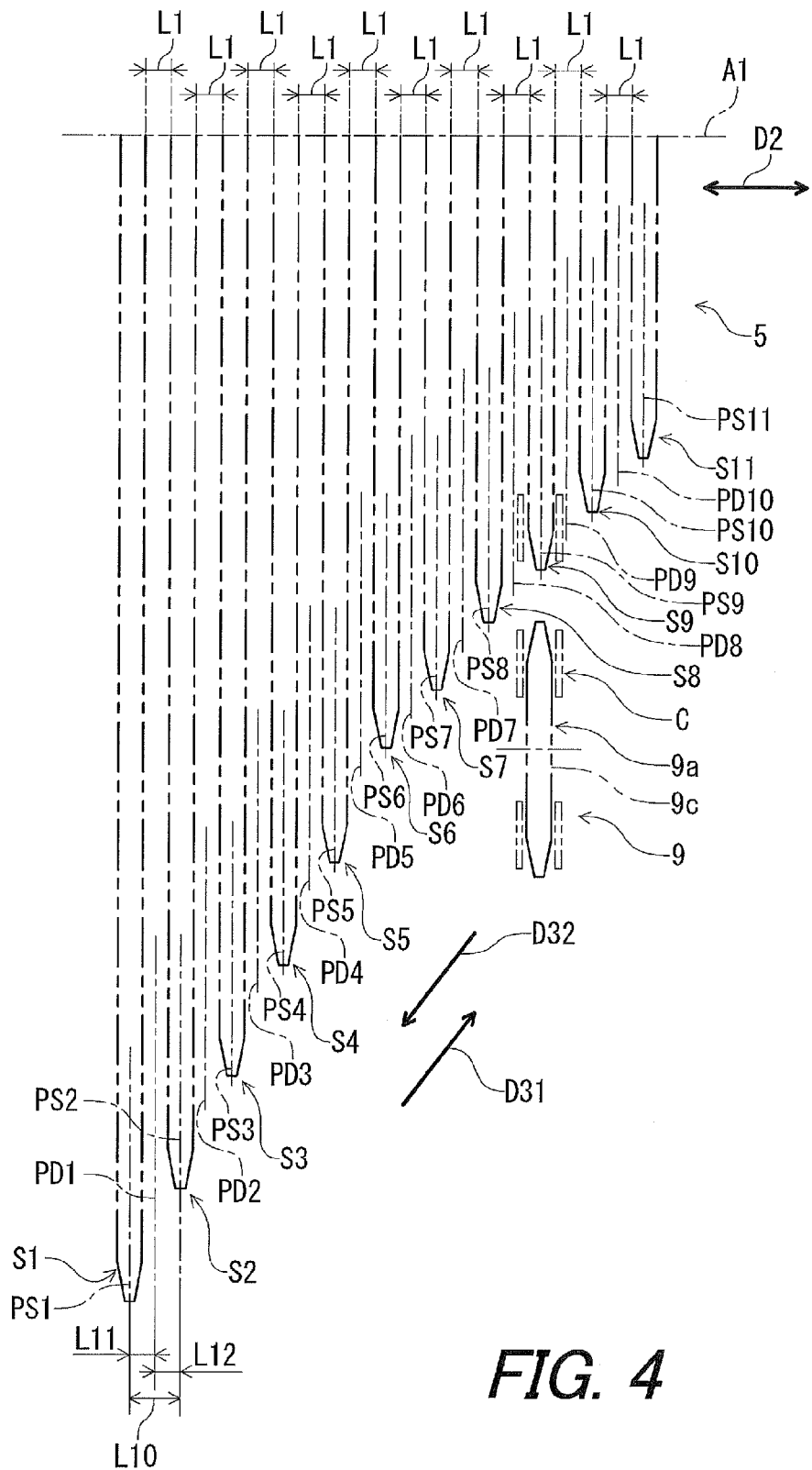
FIG. 4 is a partial rear schematic view of the sprocket assembly and the derailleur of the bicycle illustrated in FIG. 1.

As seen in FIG. 4, the first to eleven sprockets S1 to S11 are arranged in an axial direction D2 parallel to the rotational center axis A1. The first to eleventh sprockets S1 to S11 are spaced apart from each other in the axial direction D2. In the illustrated embodiment, a clearance between adjacent two sprockets of the sprocket assembly 5 corresponding to the adjacent two shift positions is less than 2.3 mm. For example, a clearance L1 between adjacent two sprockets of the sprockets S1 to S11 is approximately 2.18 mm. However, the clearance L1 can be equal to or larger than 2.3 mm if needed and/or desired. Furthermore, the clearances L1 can be at least partially different from each other.

Upshifting occurs when the bicycle chain C is shifted by the derailleur 9 from a larger sprocket to a neighboring smaller sprocket in an upshifting direction D31. Downshifting occurs when the bicycle chain C is shifted by the derailleur 9 from a small sprocket to a neighboring larger sprocket in a downshifting direction D32.

The chain guide 9a is configured to guide the bicycle chain C configured to engage with the sprocket assembly 5. The chain guide 9a is movable relative to the sprocket assembly 5 in the upshifting direction D31 and the downshifting direction D32. The guide actuator 9b (FIG. 3) is configured to move the chain guide 9a to shift the bicycle chain C in the upshifting direction D31 and the downshifting direction D32.

As seen in FIG. 2, the sprockets S1 to S11 have a shift assist structure configured to assist a shifting motion of the bicycle chain C. In the illustrated embodiment, the sprockets S1 to S11 have the shift assist structures AS1 to AS11, respectively.

Figure 5:
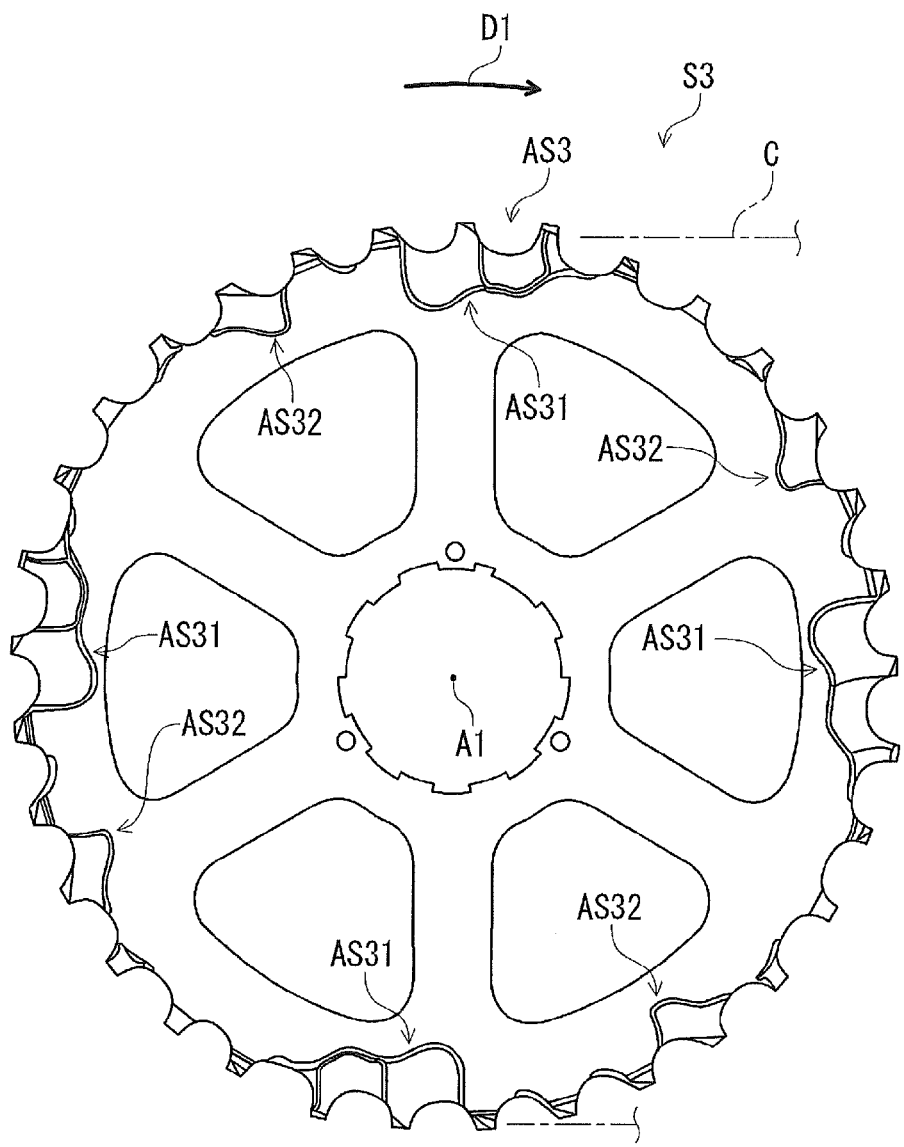
FIG. 5 is a side elevational view of a sprocket of the sprocket assembly illustrated in FIG. 2.

As seen in FIG. 5, for example, the shift assist structure AS3 of the sprocket S3 includes at least one shift assist recess. In the illustrated embodiment, the shift assist structure AS3 includes upshift assist recesses AS31 and downshift assist recesses AS32 as the at least one shift assist recess. The upshift assist recesses AS31 are configured to assist an upshifting motion of the bicycle chain C. The downshift assist recesses AS32 are configured to assist a downshifting motion of the bicycle chain C. More specifically, the upshift assist recesses AS31 are configured to reduce interference between the sprocket S3 and the bicycle chain C in the upshifting motion of the bicycle chain C. The downshift assist recesses AS32 are configured to reduce interference between the sprocket S3 and the bicycle chain C in the downshifting motion of the bicycle chain C.

The shift assist structure AS3 can include at least one shift assist tooth and/or at least one shift assist gap instead of or in addition to the at least one shift assist recess. The shift assist gap is free from an additional tooth configured to engage with the bicycle chain C.

As well as the shift assist structure AS3 of the sprocket S3, each of the shift assist structures AS1, AS2 and AS4 to AS11 (FIG. 2) includes at least one shift assist recess. Since they have substantially the same structure as the shift assist structure AS3, they will not be described and/or illustrated in detail here for the sake of brevity.

Figure 6:
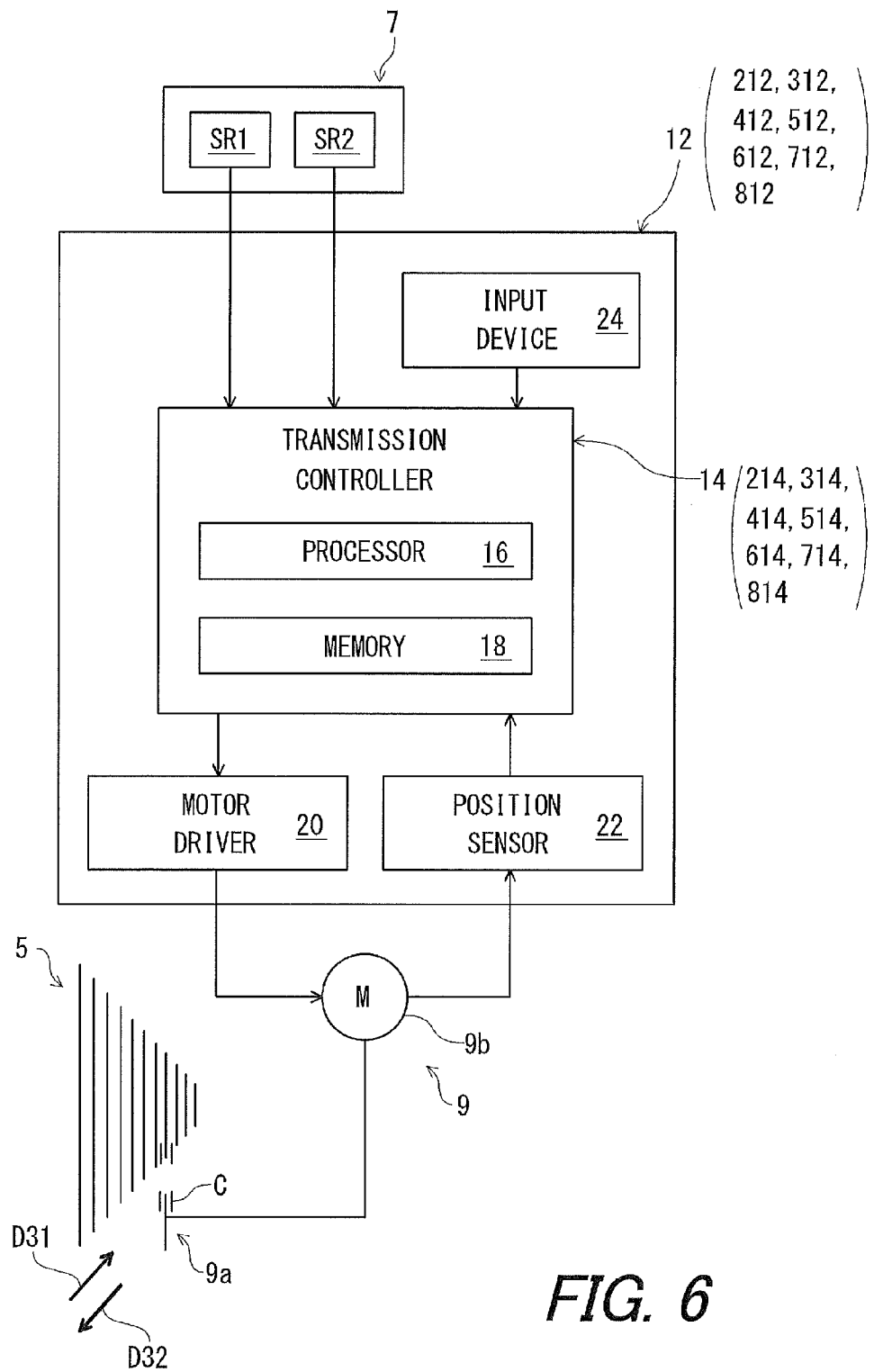
FIG. 6 is a schematic block diagram of the bicycle shifting control apparatus illustrated in FIG. 1.

As seen in FIG. 6, the bicycle shifting control apparatus 12 comprises a transmission controller 14. The transmission controller 14 is configured to control the guide actuator 9b of the derailleur 9 to move the chain guide 9a of the derailleur 9 between a plurality of shift positions in response to an input shifting signal. The input shifting signal is inputted from the shifter 7.

The shifter 7 includes a first operating member SR1 and a second operating member SR2. The first operating member SR1 is configured to be operated by a user for upshifting. The second operating member SR2 is configured to be operated by the user for the downshifting.

In the illustrated embodiment, the transmission controller 14 is constituted as a microcomputer and includes a processor 16 and a memory 18. The processor 16 includes a central processing unit (CPU). The memory 18 includes a read only memory (ROM) and a random access memory (RAM). For example, a program stored in the memory 18 is read into the processor 16, and thereby several functions of the transmission controller 14 are performed.

While the functions of the transmission controller 14 are performed by software, the functions of the transmission controller 14 can be at least partially performed by hardware or a combination of the software and the hardware.

The bicycle shifting control apparatus 12 includes a motor driver 20 and a position sensor 22. The motor driver 20 is configured to control the guide actuator 9b based on commands and/or signals from the transmission controller 14. Possible examples of the guide actuator 9b include a direct-current (DC) motor and a stepper motor. The position sensor 22 is configured to sense a current shift position of the derailleur 9. Possible examples of the position sensor 22 include a potentiometer and a rotary encoder.

As seen in FIGS. 4 and 6, the transmission controller 14 is configured to control, in a shifting operation of the chain guide 9a between adjacent two shift positions of the plurality of shift positions, the guide actuator 9b to temporarily decelerate the chain guide 9a at a deceleration position so that the bicycle chain C engages with and/or disengages from one of the sprockets S1 to S11 having the shift assist structure prior to completion of the shifting operation of the chain guide 9a.

In the present application, the term "decelerating the chain guide" includes at least one of reducing a speed of the chain guide to a lower speed and reducing a speed of the chain guide 9a to zero to stop the chain guide 9a.

In the illustrated embodiment, the deceleration position includes a waiting position. The transmission controller 14 is configured to control, in the shifting operation of the chain guide 9a between adjacent two shift positions of the plurality of shift positions, the guide actuator 9b to temporarily stop the chain guide 9a at the waiting position defined between the adjacent two shift positions so that the bicycle chain C engages with and/or disengages from one of the sprockets having the shift assist structure prior to completion of the shifting operation of the chain guide 9a.

As seen in FIG. 4, the deceleration position is defined between the adjacent two shift positions. In the illustrated embodiment, the deceleration position is defined at a substantially middle position between adjacent two sprockets of the sprocket assembly 5 corresponding to the adjacent two shift positions. For example, deceleration positions PD1 to PD10 are defined at substantially middle positions between the sprockets S1 to S11, respectively.

The sprocket assembly 5 has eleven shift positions PS1 to PS11. The shift positions PS1 to PS11 are defined relative to the sprockets S1 to S11, respectively. In the present application, the shift positions PS1 to PS11 are defined at axial centers of the sprockets S1 to S11, respectively. The deceleration positions PD1 to PD10 are defined at substantially middle positions between the shift positions PS1 to PS11, respectively.

In the illustrated embodiment, the deceleration positions PD1 to PD10 include waiting positions. It can be said that the deceleration positions PD1 to PD10 coincide with the waiting positions. The deceleration positions PD1 to PD10 can be referred to as waiting positions PD1 to PD10.

As seen in FIG. 4, a distance L11 between the deceleration position PD1 and the sprocket S1 of the sprocket assembly 5 corresponding to one of the adjacent two shift positions PS1 and PS2 is equal to a half of a distance L10 between adjacent two sprockets S1 and S2 of the sprocket assembly 5 corresponding to the adjacent two shift positions PS1 and PS2. A distance L12 between the deceleration position PD1 and the sprocket S2 of the sprocket assembly 5 corresponding to the other of the adjacent two shift positions PS1 and PS2 is equal to the half of the distance L10.

The distance L11 is defined between the deceleration position PD1 and an axial center of the sprocket S1 (namely, between the deceleration position PD1 and the shift position PS1) in the axial direction D2. The distance L12 is defined between the deceleration position PD1 and an axial center of the sprocket S2 (namely, between the deceleration position PD1 and the shift position PS2) in the axial direction D2. The distance L10 is define between the axial centers of the sprockets S1 and S2 (namely, between the shift positions PS1 and PS2) in the axial direction D2.

In the illustrated embodiment, the sprocket S1 is referred to as the sprocket corresponding to one of the adjacent two shift positions, and the sprocket S2 is referred to as the sprocket corresponding to the other of the adjacent two shift positions. However, the sprocket S2 can referred to as the sprocket corresponding to one of the adjacent two shift positions, and the sprocket S1 can be referred to as the sprocket corresponding to the other of the adjacent two shift positions.

While FIG. 4 illustrates only a positional relationship between the deceleration position PD1 and each of the sprockets S1 and S2, this positional relationship is applied to other adjacent two sprockets of the sprocket assembly 5.

As seen in FIG. 6, the transmission controller 14 is configured to store the deceleration position. For example, the transmission controller 14 is configured to store the deceleration positions PD1 to PD10 (FIG. 4) in the memory 18. It can be said that the transmission controller 14 is configured to store the waiting positions as the deceleration positions PD1 to PD10. In the illustrated embodiment, the memory 18 serves as a position memory configured to store the deceleration position (the waiting position). Namely, the transmission controller 14 includes the position memory.

In the illustrated embodiment, the bicycle shifting control apparatus 12 further comprises an input device 24 configured to allow a user to input the deceleration position. The input device 24 is mounted on the handlebar 1 (FIG. 1). The transmission controller 14 is configured to store a latest deceleration position inputted from the input device 24 as the deceleration position. For example, the input device 24 is configured to allow a user to input deceleration positions as the deceleration positions PD1 to PD10, respectively. The transmission controller 14 is configured to store latest deceleration positions inputted from the input device 24 as the deceleration positions PD1 to PD10, respectively. This allows the user to change the deceleration position.

In another example, the input device 24 is configured to allow a user to input one of the deceleration positions PD1 to PD10 as a reference deceleration position. The transmission controller 14 is configured to calculate and store the others of the deceleration positions PD1 to PD10 based on the reference deceleration position corresponding to the one of the deceleration positions PD1 to PD10. Specifically, the transmission controller 14 is configured to calculate an amount of change between the reference deceleration position and a previous reference deceleration position which each correspond to the one of deceleration positions PD1 to PD10. The transmission controller 14 is configured to change the others of the deceleration positions PD1 to PD10 based on the amount of change. This also allows the user to change the deceleration position.

Figure 7:
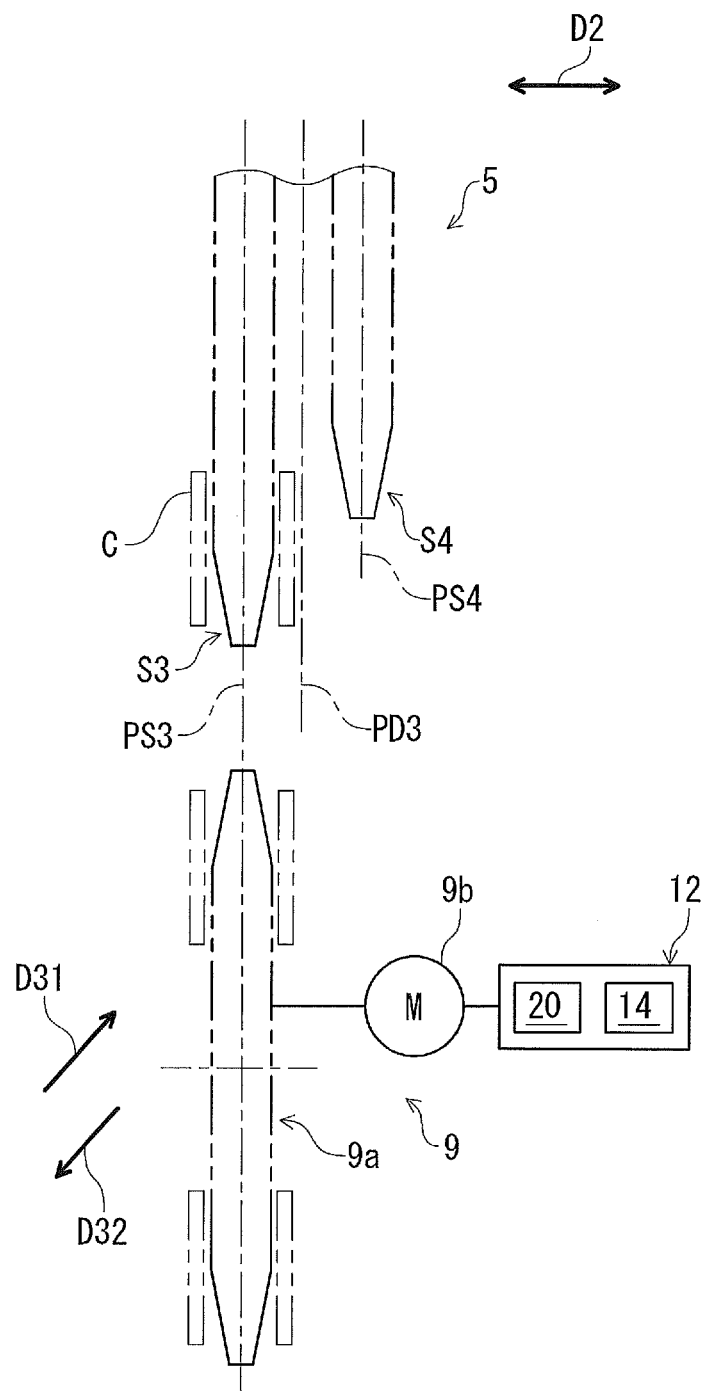
FIG. 7 is a partial schematic view of the sprocket assembly, the derailleur, and the bicycle shifting control apparatus illustrated in FIG. 1.
Figure 8:
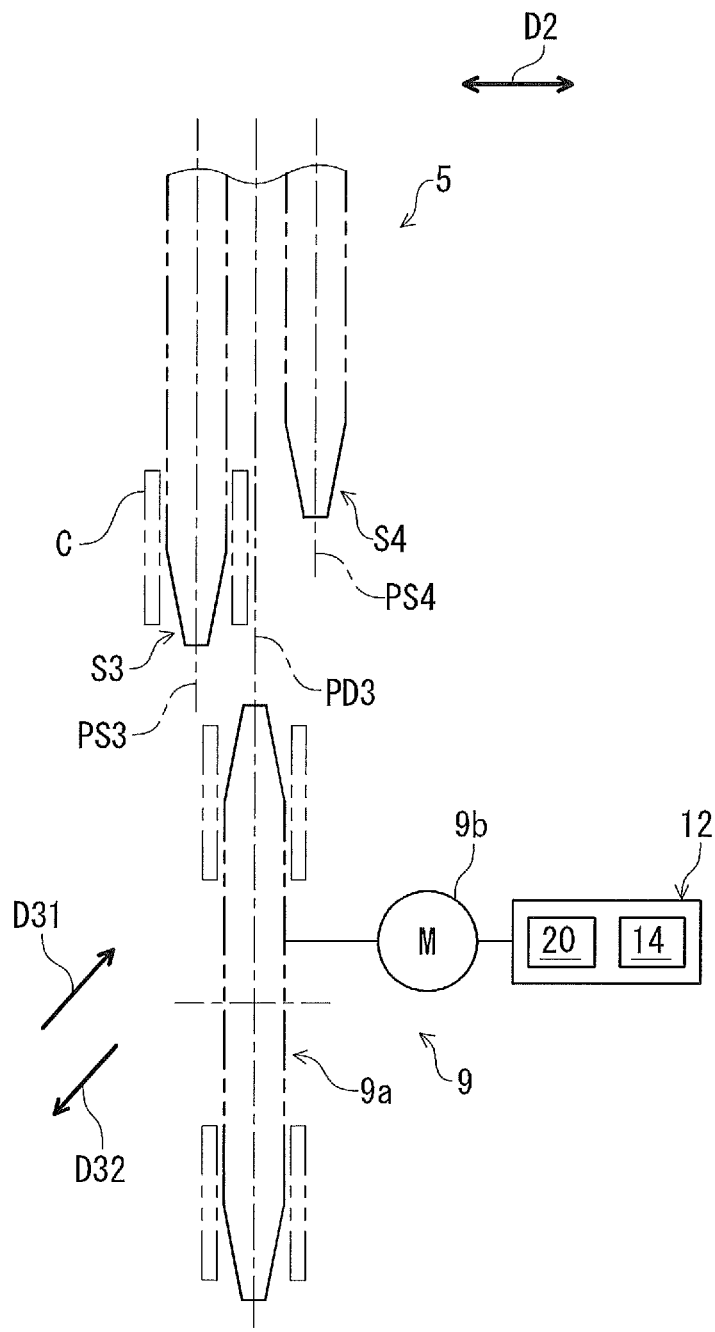
FIG. 8 is a partial schematic view of the sprocket assembly, the derailleur, and the bicycle shifting control apparatus illustrated in FIG. 1.
Figure 9:
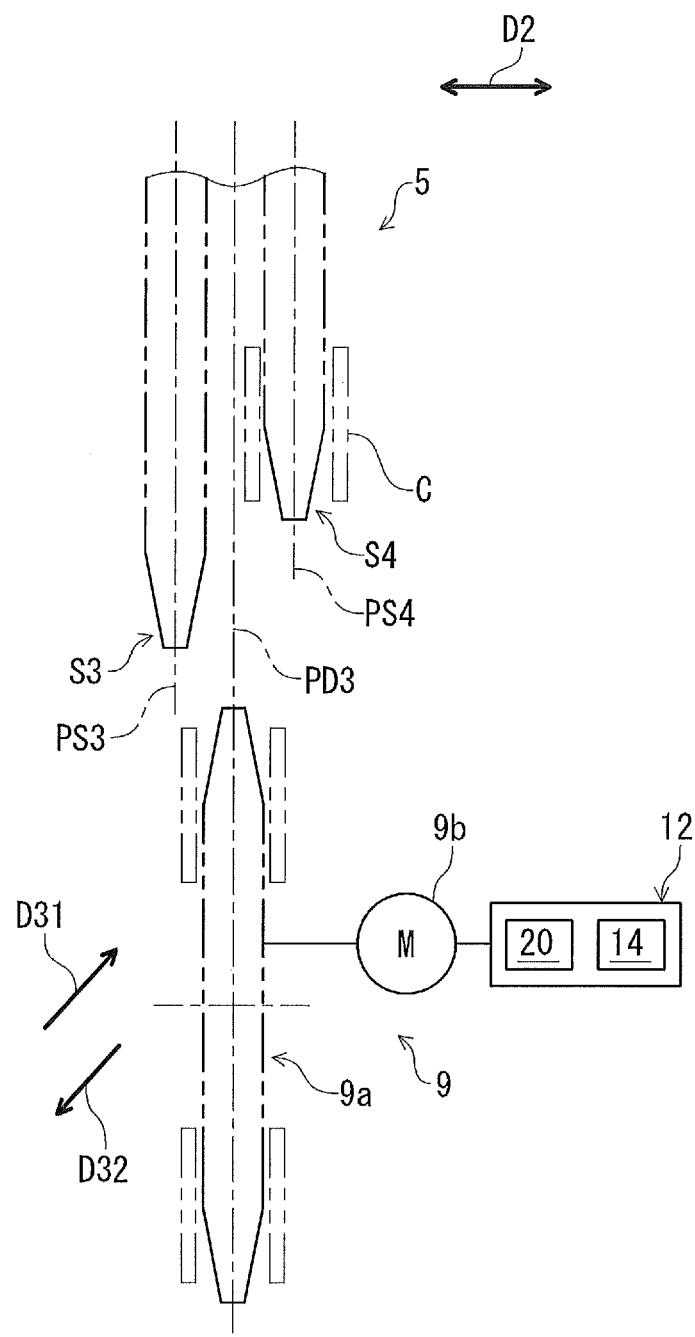
FIG. 9 is a partial schematic view of the sprocket assembly, the derailleur, and the bicycle shifting control apparatus illustrated in FIG. 1.
Figure 10:
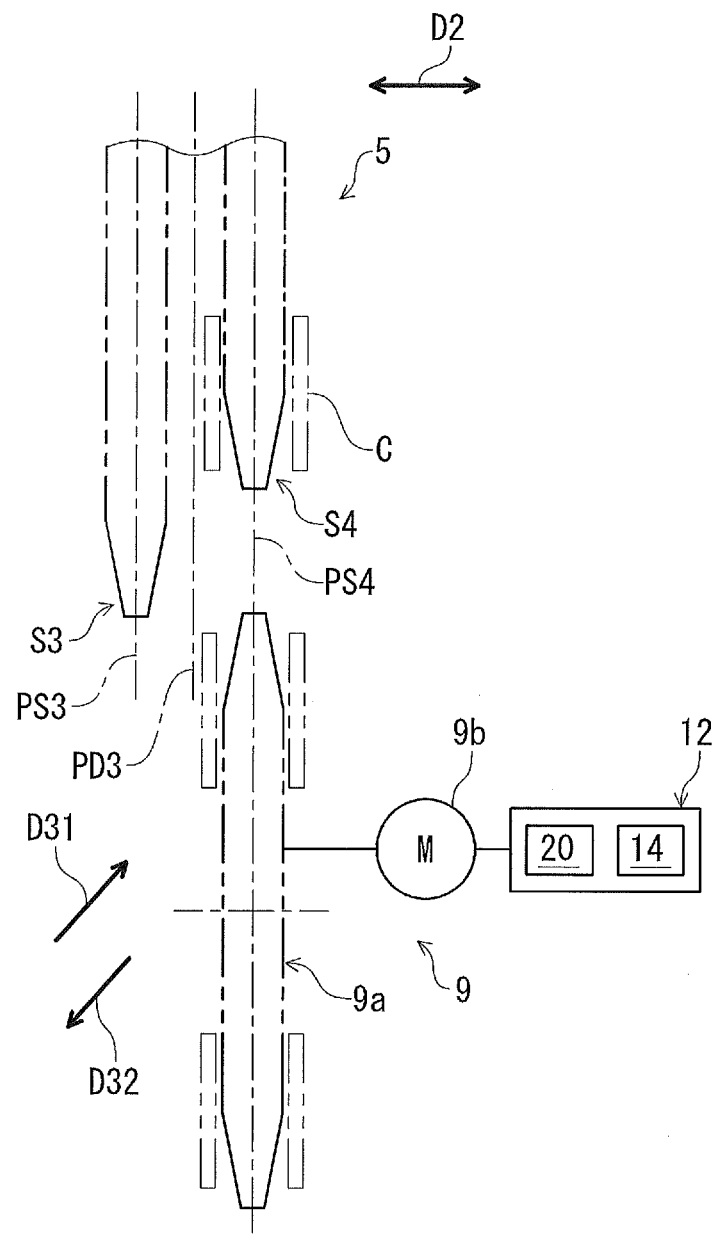
FIG. 10 is a partial schematic view of the sprocket assembly, the derailleur, and the bicycle shifting control apparatus illustrated in FIG. 1.

FIGS. 7 to 10 illustrate an example of each of the upshifting operation and the downshifting operation of the chain guide 9a. The upshifting operation is illustrated in FIG. 7 to FIG. 10 in this order. The downshifting operation of the chain guide 9a is illustrated in FIG. 10 to FIG. 7 in this order.

As seen in FIGS. 7 to 10, in the upshifting operation of the chain guide 9a from the sprocket S3 to the sprocket S4, the transmission controller 14 (FIG. 6) is configured to control the guide actuator 9b to temporarily decelerate the chain guide 9a at the deceleration position PD3 (or at a position close to the deceleration position PD3) so that the bicycle chain C disengages from the sprocket S3 having the shift assist structure AS3 (FIG. 5) prior to completion of the upshifting operation of the chain guide 9a. Furthermore, in the upshifting operation of the chain guide 9a from the sprocket S3 to the sprocket S4, the transmission controller 14 (FIG. 6) is configured to control the guide actuator 9b to temporarily decelerate the chain guide 9a at the deceleration position PD3 (or at a position close to the deceleration position PD3) so that the bicycle chain C engages with the sprocket S4 having the shift assist structure AS4 (FIG. 5) prior to completion of the upshifting operation of the chain guide 9a.

As seen in FIGS. 7 to 10, in the downshifting operation of the chain guide 9a from the sprocket S4 to the sprocket S3, the transmission controller 14 is configured to control the guide actuator 9b to temporarily decelerate the chain guide 9a at the deceleration position PD3 (or at a position close to the deceleration position PD3) so that the bicycle chain C disengages from the sprocket S4 having the shift assist structure AS4 (FIG. 5) prior to completion of the downshifting operation of the chain guide 9a. Furthermore, in the downshifting operation of the chain guide 9a from the sprocket S4 to the sprocket S3, the transmission controller 14 is configured to control the guide actuator 9b to temporarily decelerate the chain guide 9a at the deceleration position PD3 (or at a position close to the deceleration position PD3) so that the bicycle chain C engages with the sprocket S3 having the shift assist structure AS3 (FIG. 5) prior to completion of the downshifting operation of the chain guide 9a.

Figure 11:
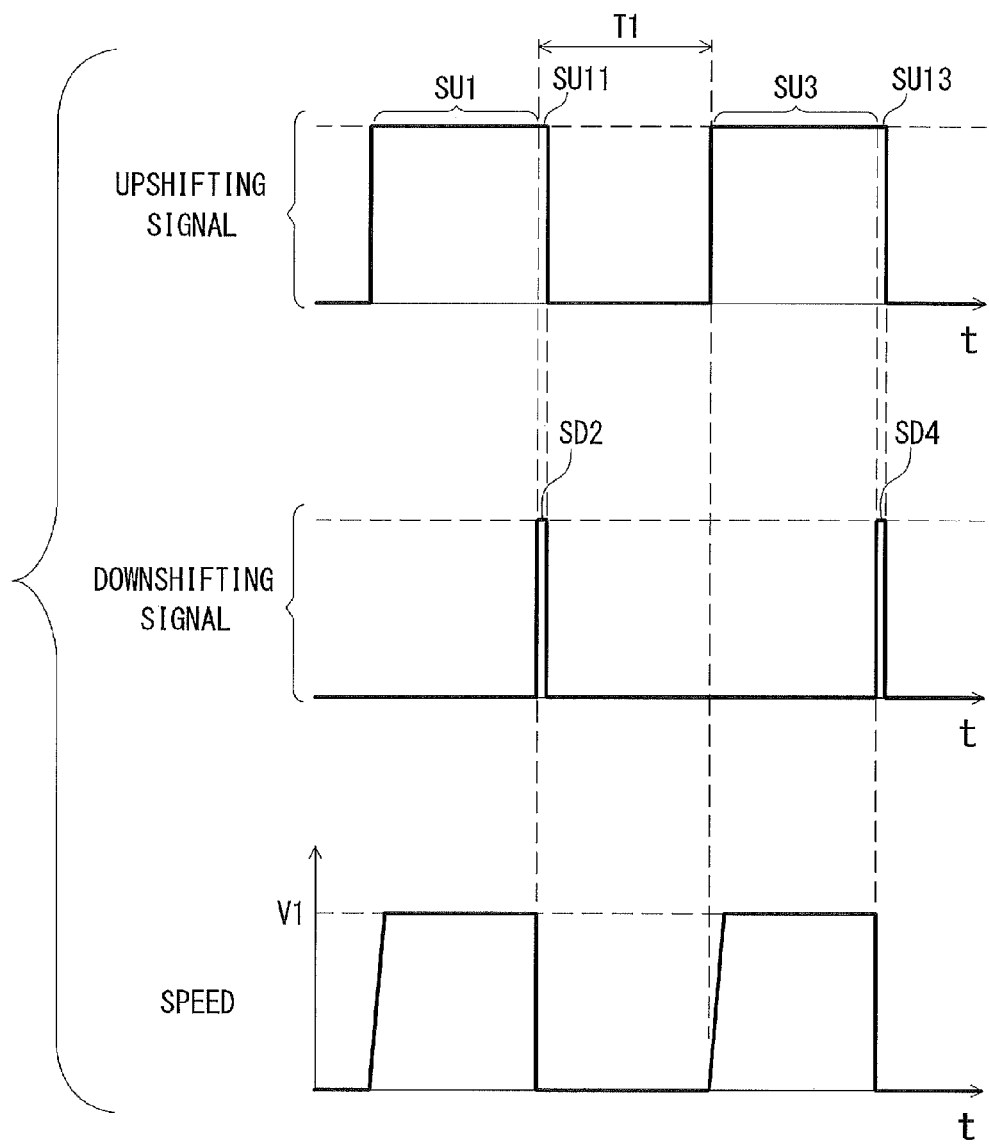
FIG. 11 is a timing chart showing an operation of the bicycle shifting control apparatus illustrated in FIG. 1 (an upshifting operation)
Figure 12:
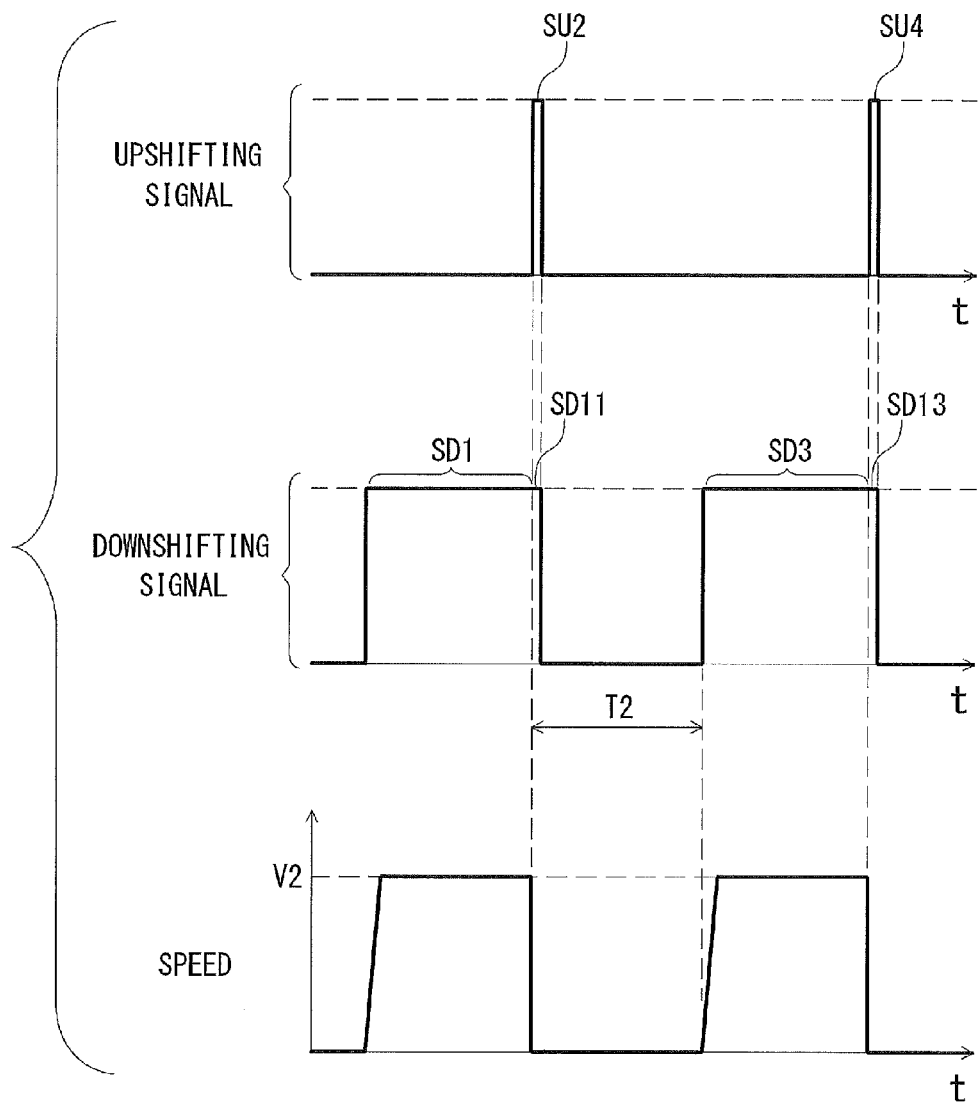
FIG. 12 is a timing chart showing an operation of the bicycle shifting control apparatus illustrated in FIG. 1 (a downshifting operation)

As seen in FIGS. 11 and 12, the transmission controller 14 is configured to generate a first moving signal to move the chain guide 9a in a first shifting direction and a second moving signal to move the chain guide 9a in a second shifting direction opposite to the first shifting direction. The transmission controller 14 is configured to generate one of the first moving signal and the second moving signal in response to one of a first input shifting signal and a second input shifting signal so that the chain guide 9a is moved from one of the adjacent two shift positions to the waiting position. An input upshifting signal and an input downshifting signal are inputted from the first operating member SR1 and the second operating member SR2 of the shifter 7 (FIG. 6) as the first input shifting signal and the second input shifting signal, respectively.

As seen in FIGS. 6 and 11, in the upshifting operation of the chain guide 9a, the transmission controller 14 is configured to generate, as the first moving signal, an upshifting signal SU1 to move the chain guide 9a in the upshifting direction D31. More specifically, in the upshifting operation of the chain guide 9a, the transmission controller 14 is configured to generate, as the first moving signal, the upshifting signal SU1 in response to the input upshifting signal so that the chain guide 9a is moved from one of the adjacent two shift positions to the waiting position. The motor driver 20 is configured to control the guide actuator 9b to move the chain guide 9a in the upshifting direction D31 based on the upshifting signal SU1. Thus, the speed of the chain guide 9a increases up to a speed V1.

As seen in FIGS. 6 and 12, in the downshifting operation of the chain guide 9a, the transmission controller 14 is configured to generate, as the second moving signal, a downshifting signal SD1 to move the chain guide 9a in the downshifting direction D32. More specifically, in the downshifting operation of the chain guide 9a, the transmission controller 14 is configured to generate, as the first moving signal, the downshifting signal SD1 in response to the input downshifting signal so that the chain guide 9a is moved from one of the adjacent two shift positions to the waiting position. The motor driver 20 is configured to control the guide actuator 9b to move the chain guide 9a in the downshifting direction D32 based on the downshifting signal SD1. Thus, the speed of the chain guide 9a increases up to a speed V2. While the speed V2 is equal to the speed V1 in the illustrated embodiment, the speed V2 can be different from the speed V1.

In the present application, as seen in FIG. 6, the first shifting direction is also referred to as the upshifting direction D31, and the second shifting direction is also referred to as the downshifting direction D32. However, the first shifting direction can be the downshifting direction D32, and the second shifting direction can be the upshifting direction D31.

The processor 16 serves as a moving signal generator configured to generate the first moving signal to move the chain guide 9a in the first shifting direction and the second moving signal to move the chain guide 9a in the second shifting direction opposite to the first shifting direction. Namely, the transmission controller 14 includes the moving signal generator.

As seen in FIGS. 11 and 12, the transmission controller 14 is configured to generate a temporarily decelerating signal to temporarily decelerate a movement of the chain guide 9a in the first shifting direction and the second shifting direction. The temporarily decelerating signal includes a temporarily stopping signal to temporarily stop the chain guide 9a at the waiting position. The transmission controller 14 is configured to generate the temporarily stopping signal to temporarily stop a movement of the chain guide 9a in the first shifting direction and the second shifting direction. The transmission controller 14 is configured to generate the temporarily stopping signal so that the chain guide 9a is stopped at the waiting position. The temporarily stopping signal includes a braking signal to apply a braking force to the chain guide 9a to stop the chain guide 9a at the waiting position.

As seen in FIGS. 6, 8 and 11, in the upshifting operation of the chain guide 9a, the transmission controller 14 is configured to generate the temporarily decelerating signal to temporarily decelerate a movement of the chain guide 9a in the upshifting direction D31. More specifically, in the upshifting operation of the chain guide 9a, the transmission controller 14 is configured to generate, as the temporarily stopping signal, an upshifting signal SU11 and a downshifting signal SD2 so that the chain guide 9a is stopped at the waiting position (e.g., the deceleration position PD3). In the upshifting operation of the chain guide 9a, the transmission controller 14 is configured to generate, as the braking signal, the downshifting signal SD2 to apply the braking force from the guide actuator 9b to the chain guide 9a to stop the chain guide 9a at the waiting position. Thus, the speed of the chain guide 9a is instantaneously reduced to zero, causing the chain guide 9a to be stopped at the waiting position.

While the temporarily stopping signal includes the upshifting signal SU11 and the downshifting signal SD2 in the illustrated embodiment, the temporarily stopping signal can include only the downshifting signal SD2 if needed and/or desired. While the upshifting signals SU1 and SU11 are continuously generated, the upshifting signal SU11 can be separately generated from the upshifting signal SU1.

As seen in FIGS. 6, 9 and 12, in the downshifting operation of the chain guide 9a, the transmission controller 14 is configured to generate the temporarily decelerating signal to temporarily decelerate a movement of the chain guide 9a in the downshifting direction D32. More specifically, in the downshifting operation of the chain guide 9a, the transmission controller 14 is configured to generate, as the temporarily stopping signal, an upshifting signal SU2 and a downshifting signal SD11 so that the chain guide 9a is stopped at the waiting position (e.g., the deceleration position PD3). In the downshifting operation of the chain guide 9a, the transmission controller 14 is configured to generate, as the braking signal, the upshifting signal SU2 to apply the braking force from the guide actuator 9b to the chain guide 9a to stop the chain guide 9a at the waiting position. The speed of the chain guide 9a is instantaneously reduced to zero, causing the chain guide 9a to be stopped at the waiting position.

While the temporarily stopping signal includes the upshifting signal SU2 and the downshifting signal SD11 in the illustrated embodiment, the temporarily stopping signal can include only the upshifting signal SU2 if needed and/or desired. While the downshifting signals SD1 and SD11 are continuously generated, the downshifting signal SD11 can be separately generated from the downshifting signal SD1.

The processor 16 (FIG. 6) serves as a decelerating signal generator configured to generate the temporarily decelerating signal to temporarily decelerate the movement of the chain guide 9a in the first shifting direction and the second shifting direction. Namely, the transmission controller 14 includes the decelerating signal generator.

As seen in FIGS. 11 and 12, the transmission controller 14 is configured to generate the one of the first moving signal and the second moving signal so that the chain guide 9a is moved from the waiting position to the other of the adjacent two shift positions. It can be said that the transmission controller 14 is configured to regenerate the one of the first moving signal and the second moving signal.

As seen in FIGS. 6, 7 and 11, in the upshifting operation of the chain guide 9a, the transmission controller 14 is configured to generate the upshifting signal SU3 so that the chain guide 9a is moved from the waiting position (e.g., the deceleration position PD3) to the other of the adjacent two shift positions (e.g., the shift position PS4). Thus, the speed of the chain guide 9a increases up to the speed V1 again.

As seen in FIGS. 6, 8 and 12, in the downshifting operation of the chain guide 9a, the transmission controller 14 is configured to generate the downshifting signal SD3 so that the chain guide 9a is moved from the waiting position (e.g., the deceleration position PD3) to the other of the adjacent two shift positions (e.g., the shift position PS3). Thus, the speed of the chain guide 9a increases up to the speed V2 again.

As seen in FIGS. 6, 11 and 12, the transmission controller 14 is configured to generate a stopping signal to stop the chain guide 9a at a target shift position. As seen in FIG. 11, in the upshifting operation of the chain guide 9a, the transmission controller 14 is configured to generate, as the stopping signal, an upshifting signal SU13 and a downshifting signal SD4 to stop the chain guide 9a at the target shift position (e.g., the shift position PS4 in FIG. 10). As seen in FIG. 12, in the downshifting operation of the chain guide 9a, the transmission controller 14 is configured to generate, as the stopping signal, an upshifting signal SU4 and a downshifting signal SD13 to stop the chain guide 9a at the target shift position (e.g., the shift position PS2 in FIG. 7).

As seen in FIG. 11, while the stopping signal includes the upshifting signal SU13 and the downshifting signal SD4 in the upshifting operation, the stopping signal can include only the downshifting signal SD4 if needed and/or desired. While the upshifting signals SU3 and SU13 are continuously generated in the upshifting operation, the upshifting signal SU13 can be separately generated from the upshifting signal SU3. Similarly, as seen in FIG. 12, while the stopping signal includes the upshifting signal SU4 and the downshifting signal SD13 in the downshifting operation, the stopping signal can include only the upshifting signal SU4 if needed and/or desired. While the downshifting signals SD3 and SD13 are continuously generated in the downshifting operation, the downshifting signal SD13 can be separately generated from the downshifting signal SD3.

As seen in FIGS. 11 and 12, the transmission controller 14 is configured to generate one of the first moving signal and the second moving signal so that the movement of the chain guide 9a between the waiting position and one of the adjacent two shift positions is equal to the movement of the chain guide 9a between the waiting position and the other of the adjacent two shift positions.

In the illustrated embodiment, a speed and a moving pattern of the chain guide 9a between the waiting position and one of the adjacent two shift positions are equal to a speed and a moving pattern of the chain guide 9a between the waiting position and the other of the adjacent two shift positions. However, the transmission controller 14 can be configured to generate one of the first moving signal and the second moving signal so that the movement of the chain guide 9a between the waiting position and one of the adjacent two shift positions is different from the movement of the chain guide 9a between the waiting position and the other of the adjacent two shift positions.

The transmission controller 14 (FIG. 6) is configured to store a decelerating time T1 or T2 (FIGS. 11 and 12) for which the chain guide 9a is temporarily decelerated at the deceleration position in the shifting operation of the chain guide 9a. For example, the transmission controller 14 is configured to store a decelerating time for which the chain guide 9a is temporarily decelerated at each of the deceleration positions PD1 to PD10 in the shifting operation of the chain guide 9a.

The memory 18 serves as a time memory configured to store the decelerating time T1 or T2 (FIGS. 11 and 12) for which the chain guide 9a is temporarily decelerated at the deceleration position in the shifting operation of the chain guide 9a. Namely, the transmission controller 14 includes the time memory.

As seen in FIGS. 11 and 12, the transmission controller 14 is configured to count an amount of time from a timing at which the chain guide 9a is temporarily decelerated. The transmission controller 14 is configured to compare the amount of time with the decelerating time T1 in the upshifting operation of the chain guide 9a. The transmission controller 14 is configured to compare the amount of time with the decelerating time T2 in the downshifting operation of the chain guide 9a.

As seen in FIG. 11, the chain guide 9a is temporarily decelerated at each of the deceleration positions PD1 to PD10 for the decelerating time T1 in the upshifting operation of the chain guide 9a. It can be said that the transmission controller 14 is configured to interrupt generating the upshifting signal for at least part of the decelerating time T1 in the upshifting operation of the chain guide 9a.

As seen in FIG. 12, the chain guide 9a is temporarily decelerated at each of the deceleration positions PD1 to PD10 for the decelerating time T2 in the downshifting operation of the chain guide 9a. It can be said that the transmission controller 14 is configured to interrupt generating the downshifting signal for at least part of the decelerating time T2 in the downshifting operation of the chain guide 9a.

As seen in FIG. 6, in the illustrated embodiment, the input device 24 is configured to allow a user to input the decelerating times T1 and T2. The transmission controller 14 is configured to store a latest decelerating time inputted from the input device 24 as the decelerating time. The transmission controller 14 is configured to store a latest decelerating time inputted from the input device 24 as each of the decelerating times T1 and T2. This allows the user to change the decelerating times T1 and T2.

At least one of the deceleration position and the decelerating time can be initially stored as constant in the memory 18. In a case where the deceleration position and the decelerating time are initially stored as constant in the memory 18, the input device 24 can be omitted from the bicycle shifting control apparatus 12 if needed and/or desired. The input device 24 can be separately provided as an input device for the deceleration position and an additional input device for the decelerating time.

Furthermore, at least one of the deceleration position and the decelerating time can be inputted using a computer in which a maintenance program is installed for setting the bicycle shifting control apparatus 12 and/or the derailleur 9. In such an embodiment, the computer can be the input device 24 configured to allow a user to input the deceleration position and/or the decelerating time.

A method of controlling the derailleur 9 will be described in detail below referring to FIGS. 13 and 14.

The method of controlling the derailleur 9 comprises moving the chain guide 9a of the derailleur 9 between a plurality of shift positions in response to the input shifting signal. More specifically, in steps S1 and S2 of FIG. 13, the input shifting signal from the shifter 7 (FIG. 6) is determined by the transmission controller 14 (FIG. 6). More specifically, in step S1, it is determined by the transmission controller 14 whether the input shifting signal is the input upshifting signal or the input downshifting signal.

Figure 13:
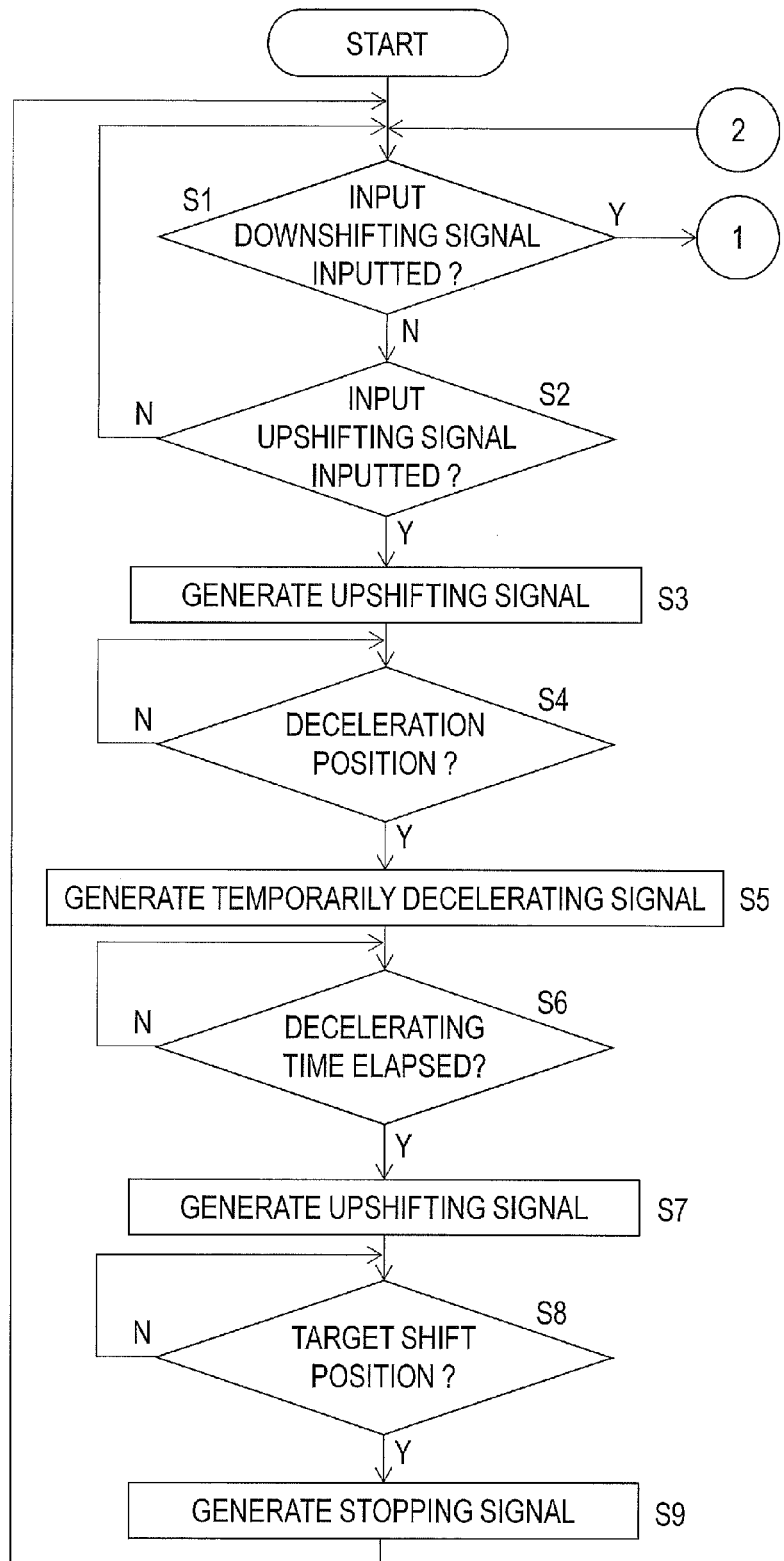
FIG. 13 is a flow chart showing an operation of the bicycle shifting control apparatus illustrated in FIG. 1.

As seen in FIG. 13, in a case where the input shifting signal is the input upshifting signal, the upshifting signal SU1 (FIG. 11) is generated by the transmission controller 14 (step S3). As seen in FIGS. 7 and 8, for example, the chain guide 9a of the derailleur 9 is moved by the guide actuator 9b from the shift position PS3 toward the deceleration position PD3 based on the upshifting signal SU1 (FIG. 11).

Figure 14:
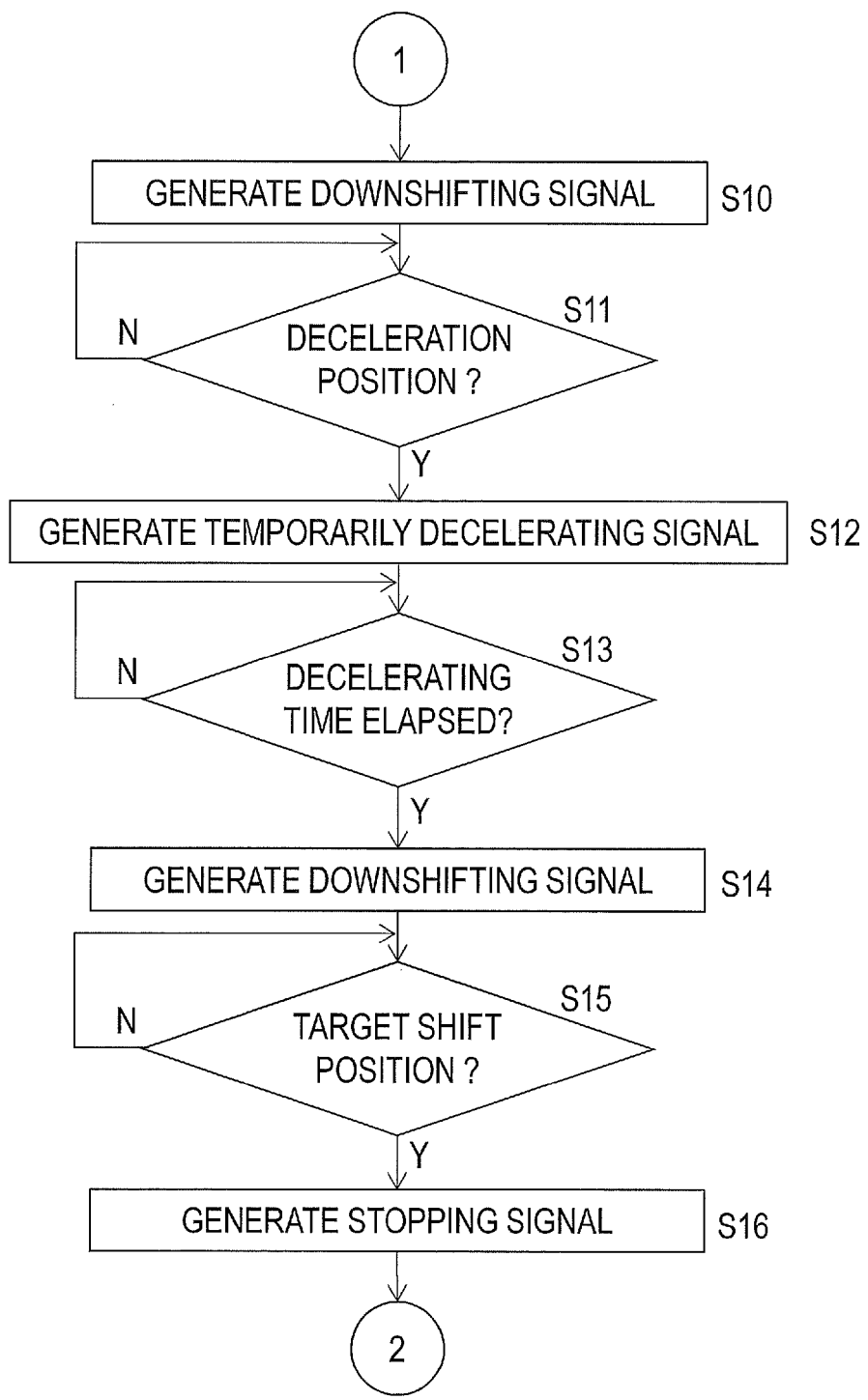
FIG. 14 is a flow chart showing an operation of the bicycle shifting control apparatus illustrated in FIG. 1.

As seen in FIG. 14, in a case where the input shifting signal is the input downshifting signal, the downshifting signal SD1 (FIG. 12) is generated by the transmission controller 14 (step S10). As seen in FIGS. 9 and 10, for example, the chain guide 9a of the derailleur 9 is moved by the guide actuator 9b from the shift position PS4 toward the deceleration position PD3 based on the downshifting signal SD1 (FIG. 12).

As seen in FIGS. 13 and 14, the method of controlling the derailleur 9 comprises decelerating the chain guide 9a temporarily, in the shifting operation of the chain guide 9a between adjacent two shift positions of the plurality of shift positions, at the deceleration position (at the waiting position) defined between the adjacent two shift positions so that the bicycle chain C engages with and/or disengages from one of the sprockets having the shift assist structure prior to completion of the shifting operation of the chain guide 9a.

As seen in FIG. 13, in step S4, it is determined by the transmission controller 14 whether the chain guide 9a reaches the deceleration position. In a case where the chain guide 9a reaches the deceleration position, the temporarily decelerating signal is generated by the transmission controller 14 in the upshifting operation of the chain guide 9a (step S5). In the illustrated embodiment, the upshifting signal SU11 and the downshifting signal SD2 (FIG. 11) are generated as the temporarily decelerating signal by the transmission controller 14. Thus, the braking force is applied from the guide actuator 9b to the chain guide 9a based on the upshifting signal SU11 and the downshifting signal SD2, causing the chain guide 9a to be temporarily stopped at the deceleration position (or at a position close to the deceleration position) in the upshifting operation of the chain guide 9a (FIG. 8).

In step S6 of FIG. 13, it is determined by the transmission controller 14 whether the decelerating time T1 is elapsed. As seen in FIGS. 8 and 9, for example, the bicycle chain C disengages from the sprocket S3 and engages with the sprocket S4 during the decelerating time T1 in the upshifting operation of the chain guide 9a.

In a case where the decelerating time T1 is elapsed, the upshifting signal SU3 (FIG. 11) is generated by the transmission controller 14 (step S7). As seen in FIGS. 9 and 10, for example, the chain guide 9a is moved by the guide actuator 9b from the deceleration position PD3 toward the shift position PS4 (the target shift position) based on the upshifting signal SU3.

In step S8, it is determined by the transmission controller 14 whether the chain guide 9a reaches the target shift position. In a case where the chain guide 9a reaches the target shift position, the stopping signal is generated by the transmission controller 14 in the upshifting operation of the chain guide 9a (step S9). In the illustrated embodiment, the upshifting signal SU13 and the downshifting signal SD4 (FIG. 11) are generated as the stopping signal by the transmission controller 14. Thus, the braking force is applied from the guide actuator 9b to the chain guide 9a based on the upshifting signal SU13 and the downshifting signal SD4, causing the chain guide 9a to be stopped at the target shift position (or at a position close to the target shift position) in the upshifting operation of the chain guide 9a. As seen in FIGS. 9 and 10, for example, the chain guide 9a is stopped at the shift position PS4 (or at a position close to the shift position PS4) in the upshifting operation of the chain guide 9a.

As seen in FIG. 14, in step S11, it is determined by the transmission controller 14 whether the chain guide 9a reaches the deceleration position. In a case where the chain guide 9a reaches the deceleration position, the temporarily decelerating signal is generated by the transmission controller 14 in the downshifting operation of the chain guide 9a (step S12). In the illustrated embodiment, the upshifting signal SU2 and the downshifting signal SD11 (FIG. 12) is generated as the temporarily decelerating signal by the transmission controller 14. Thus, the braking force is applied from the guide actuator 9b to the chain guide 9a based on the upshifting signal SU2 and the downshifting signal SD11, causing the chain guide 9a to be temporarily stopped at or around the deceleration position (or at a position close to the deceleration position) in the downshifting operation of the chain guide 9a (FIG. 9).

In step S13 of FIG. 14, it is determined by the transmission controller 14 whether the decelerating time T2 is elapsed. As seen in FIGS. 8 and 9, for example, the bicycle chain C disengages from the sprocket S4 and engages with the sprocket S3 during the decelerating time T2 in the downshifting operation of the chain guide 9a.

In a case where the decelerating time T2 is elapsed, the downshifting signal SD3 (FIG. 12) is generated by the transmission controller 14 (step S14). As seen in FIGS. 7 and 8, for example, the chain guide 9a is moved by the guide actuator 9b from the deceleration position PD3 toward the shift position PS3 (the target shift position) based on the downshifting signal SD3.

In step S15, it is determined by the transmission controller 14 whether the chain guide 9a reaches the target shift position. In a case where the chain guide 9a reaches the target shift position, the stopping signal is generated by the transmission controller 14 in the downshifting operation of the chain guide 9a (step S16). In the illustrated embodiment, the upshifting signal SU4 and the downshifting signal SD13 (FIG. 12) are generated as the stopping signal by the transmission controller 14. Thus, the braking force is applied from the guide actuator 9b to the chain guide 9a based on the upshifting signal SU4 and the downshifting signal SD13, causing the chain guide 9a to be stopped at the target shift position (or at a position close to the target shift position) in the downshifting operation of the chain guide 9a. As seen in FIGS. 7 and 8, for example, the chain guide 9a is stopped at the shift position PS3 (or at a position close to the shift position PS3) in the downshifting operation of the chain guide 9a.

With the bicycle shifting control apparatus 12, the transmission controller 14 is configured to control, in the shifting operation of the chain guide 9a between adjacent two shift positions of the plurality of shift positions, the guide actuator 9b to temporarily decelerate the chain guide 9a at the deceleration position defined between the adjacent two shift positions so that the bicycle chain engages with and/or disengages from one of the sprockets having the shift assist structure prior to completion of the shifting operation of the chain guide 9a. Accordingly, it is possible to reduce interference between the bicycle chain C and the sprocket during the shifting motion of the bicycle chain C in comparison with a bicycle shifting control apparatus configured to control the guide actuator 9b without temporarily decelerating the chain guide 9a at the deceleration position. This allows the derailleur 9 to change gears more smoothly on the sprocket assembly 5 having the shift assist structure.

Second Embodiment

A bicycle shifting control apparatus 212 in accordance with a second embodiment will be described below referring to FIGS. 6 and 15. Elements having substantially the same function as those in the first embodiment will be numbered the same here, and will not be described and/or illustrated again in detail here for the sake of brevity.

As seen in FIG. 6, the bicycle shifting control apparatus 212 comprises a transmission controller 214. The transmission controller 214 has substantially the same functions as those of the transmission controller 14 in accordance with the first embodiment.

Unlike the transmission controller 14, however, the transmission controller 214 is configured to generate one of the first moving signal and the second moving signal so that the movement of the chain guide 9a between the waiting position and one of the adjacent two shift positions is different from the movement of the chain guide 9a between the waiting position and the other of the adjacent two shift positions.

Figure 15:
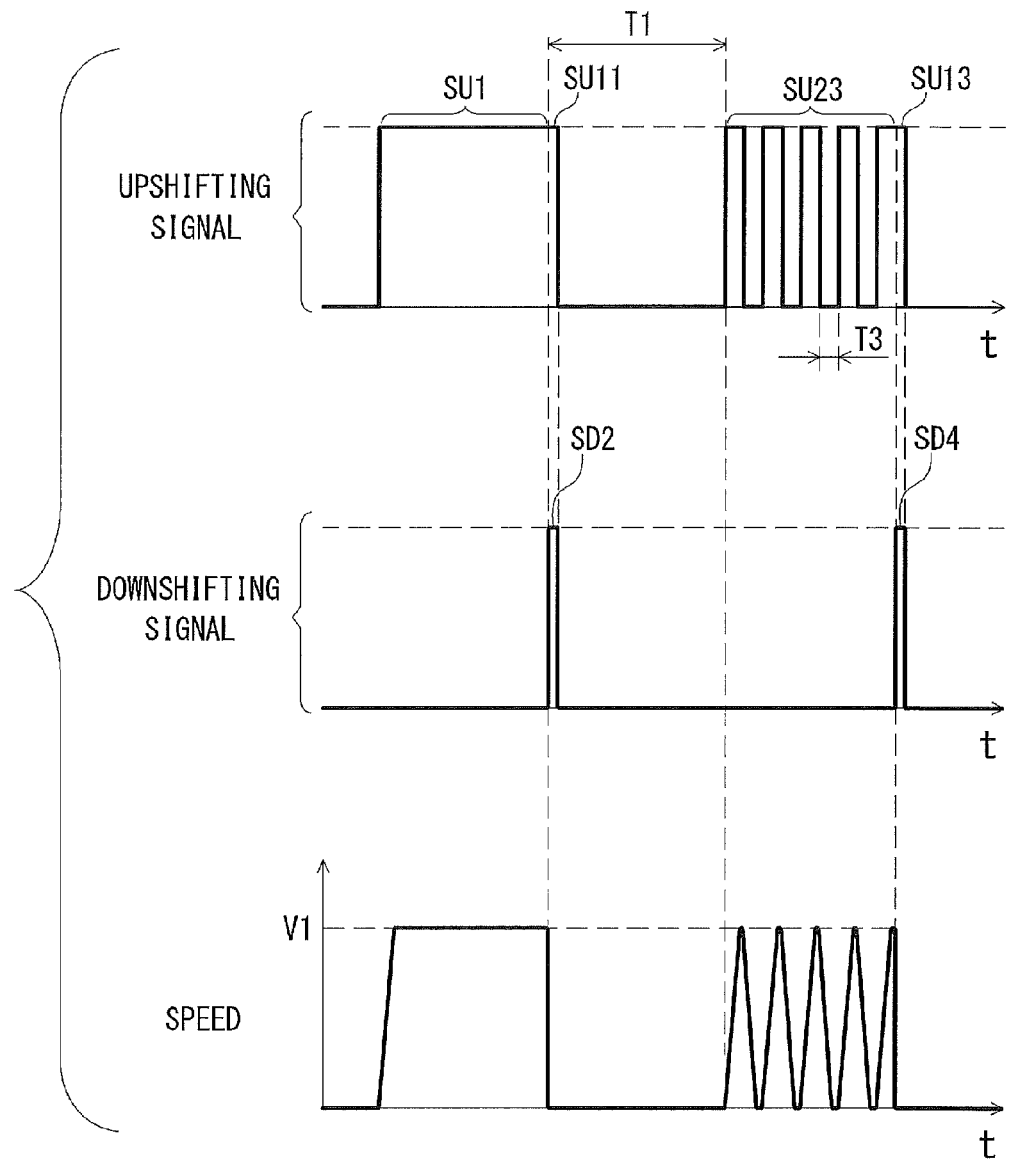
FIG. 15 is a timing chart showing an operation of a bicycle shifting control apparatus in accordance with a second embodiment.

As seen in FIG. 15, the transmission controller 214 is configured to generate the upshifting signal SU1 such that the guide actuator 9b continuously moves the chain guide 9a between a starting shift position and the waiting position with the speed V1.

On the other hand, the transmission controller 214 is configured to generate an upshifting signal SU23 such that the guide actuator 9b intermittently moves the chain guide 9a between the waiting position and the target shift position. An interval time T3 of the inching is shorter than the decelerating times T1 and T2. Such inching can be applied to the movement of the chain guide 9a between the start shift position and the waiting position and/or between the waiting position and the target shift position.

With the bicycle shifting control apparatus 212, it is possible to obtain substantially the same advantageous effect as that of the bicycle shifting control apparatus 12 in accordance with the first embodiment.

Third Embodiment

A bicycle shifting control apparatus 312 in accordance with a third embodiment will be described below referring to FIGS. 6 and 16. Elements having substantially the same function as those in the first embodiment will be numbered the same here, and will not be described and/or illustrated again in detail here for the sake of brevity.

As seen in FIG. 6, the bicycle shifting control apparatus 312 comprises a transmission controller 314. The transmission controller 314 has substantially the same functions as those of the transmission controller 14 in accordance with the first embodiment.

Unlike the transmission controller 14, however, the transmission controller 314 is configured to stop to generate the shifting signal (one of the first moving signal and the second moving signal) at the waiting position to temporarily decelerate the movement of the chain guide 9a in the shifting operation without generating the temporarily decelerating signal.

Figure 16:
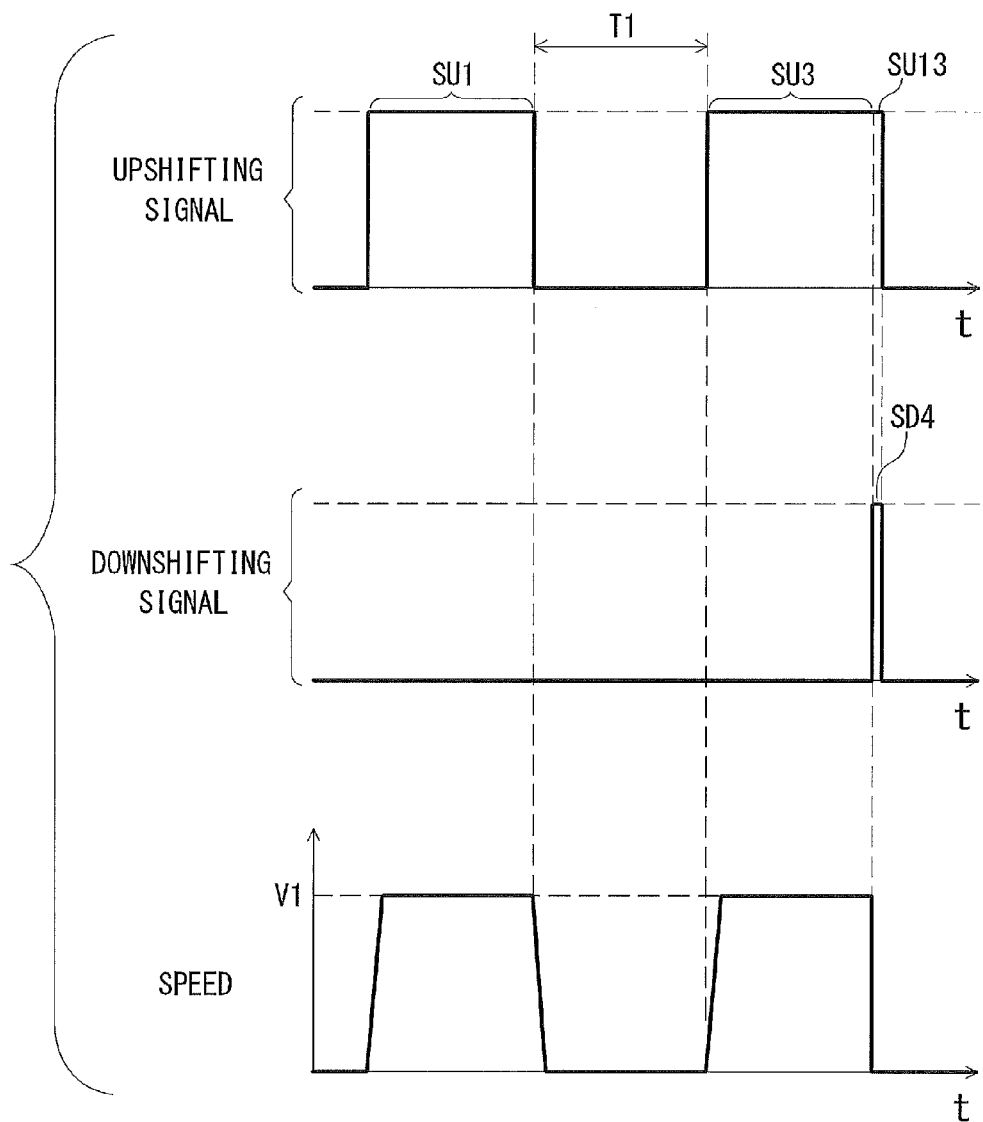
FIG. 16 is a timing chart showing an operation of a bicycle shifting control apparatus in accordance with a third embodiment.

As seen FIG. 16, for example, the transmission controller 314 is configured to stop to generate the upshifting signal SU1 at the waiting position (or at a position close to the waiting position) to temporarily decelerate the movement of the chain guide 9a in the shifting operation without generating the temporarily decelerating signal. More specifically, the transmission controller 314 is configured to stop to generate the upshifting signal SU1 to temporarily stop the chain guide 9a at the waiting position (or at a position close to the waiting position) in the shifting operation without generating the upshifting signal SU11 and the downshifting signal SD2 (FIG. 11).

In this case, the chain guide 9a can slightly move because of inertia of the chain guide 9a after stopping the shifting signal. The speed of the chain guide 9a gradually decreases to zero because of the inertia of the chain guide 9a. This causes the chain guide 9a to be stopped at a position close to the waiting position. In a case where the transmission controller 314 is configured to stop to generate the upshifting signal SU1 before the chain guide 9a reaches the waiting position, it is possible to stop the chain guide 9a at the waiting position.

With the bicycle shifting control apparatus 312, it is possible to obtain substantially the same advantageous effect as that of the bicycle shifting control apparatus 12 in accordance with the first embodiment.

Fourth Embodiment

A bicycle shifting control apparatus 412 in accordance with a fourth embodiment will be described below referring to FIGS. 6 and 17. Elements having substantially the same function as those in the first embodiment will be numbered the same here, and will not be described and/or illustrated again in detail here for the sake of brevity.

As seen in FIG. 6, the bicycle shifting control apparatus 412 comprises a transmission controller 414. The transmission controller 414 has substantially the same functions as those of the transmission controller 14 in accordance with the first embodiment.

Unlike the transmission controller 14, however, the transmission controller 414 is configured to generate a temporarily decelerating signal to temporarily decelerate the movement of the chain guide 9a in the upshifting direction and the downshifting direction (in the first shifting direction and the second shifting direction).

Figure 17:
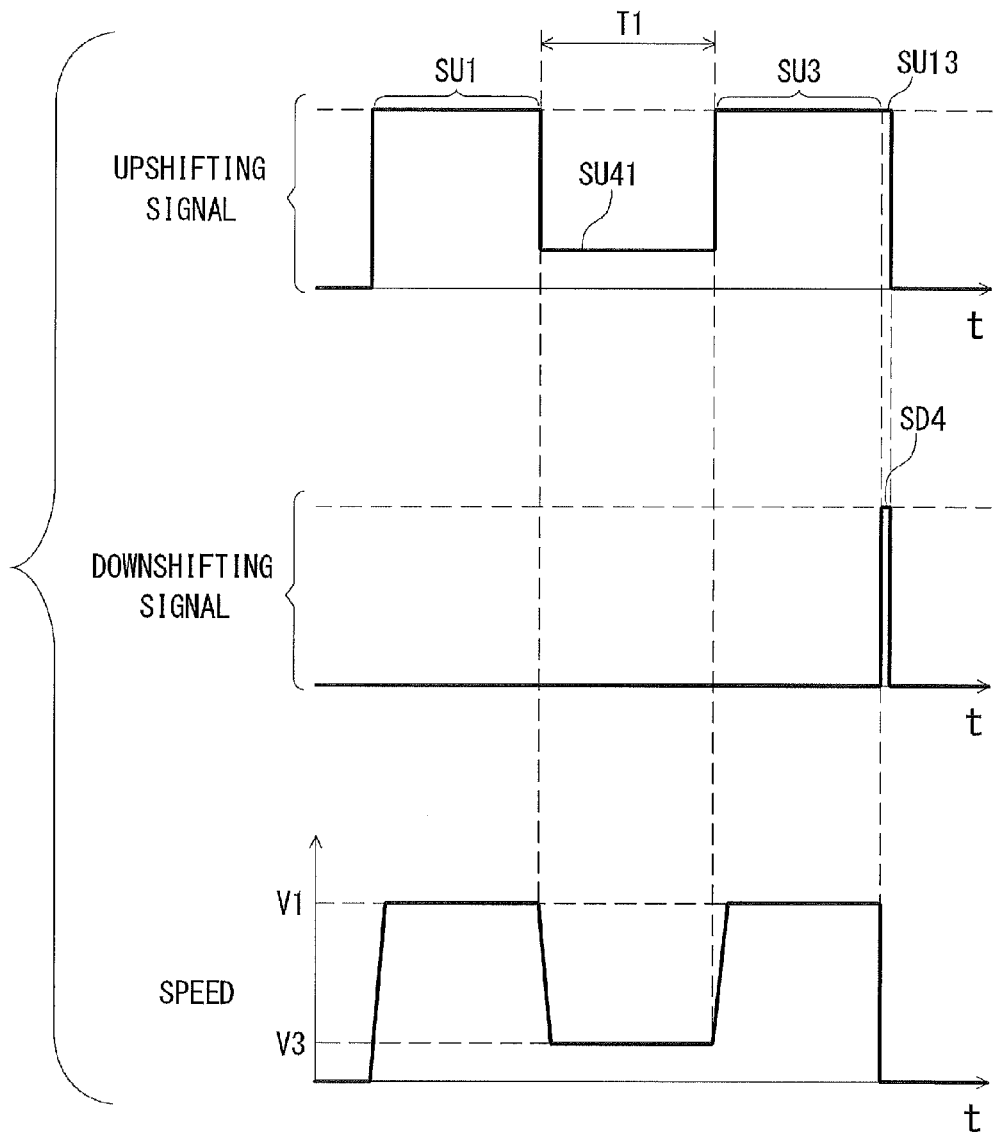
FIG. 17 is a timing chart showing an operation of a bicycle shifting control apparatus in accordance with a fourth embodiment.

As seen FIG. 17, for example, the transmission controller 414 is configured to generate the temporarily decelerating signal to temporarily reduce a speed of the chain guide 9a to a lower speed V3 at the deceleration position (or at a position close to the deceleration position) in the shifting operation of the chain guide 9a. More specifically, the transmission controller 414 is configured to generate an upshifting signal SU41 to temporarily reduce the speed of the chain guide 9a to the lower speed V3 at the deceleration position (or at a position close to the deceleration position) in the shifting operation of the chain guide 9a. In this case, the transmission controller 414 is configured to generate the upshifting signal SU41 instead of the upshifting signal SU11 and the downshifting signal SD2 (FIG. 11).

The lower speed V3 is lower than the speed V1 of the chain guide 9a between the starting shift position and the deceleration position and between the deceleration position and the target shift position. For example, the lower speed V1 is lower than a half of the speed V1.

With the bicycle shifting control apparatus 412, it is possible to obtain substantially the same advantageous effect as that of the bicycle shifting control apparatus 12 in accordance with the first embodiment.

Fifth Embodiment

A bicycle shifting control apparatus 512 in accordance with a fifth embodiment will be described below referring to FIGS. 6 and 18. Elements having substantially the same function as those in the first embodiment will be numbered the same here, and will not be described and/or illustrated again in detail here for the sake of brevity.

As seen in FIG. 6, the bicycle shifting control apparatus 512 comprises a transmission controller 514. The transmission controller 514 has substantially the same functions as those of the transmission controller 14 in accordance with the first embodiment.

Unlike the transmission controller 14, however, the transmission controller 514 is configured to generate the temporarily decelerating signal such that the braking force is applied to the chain guide 9a and such that the speed of the chain guide 9a is temporarily reduced to the lower speed V3 at the deceleration position (or at a position close to the deceleration position) in the shifting operation of the chain guide 9a.

Figure 18:
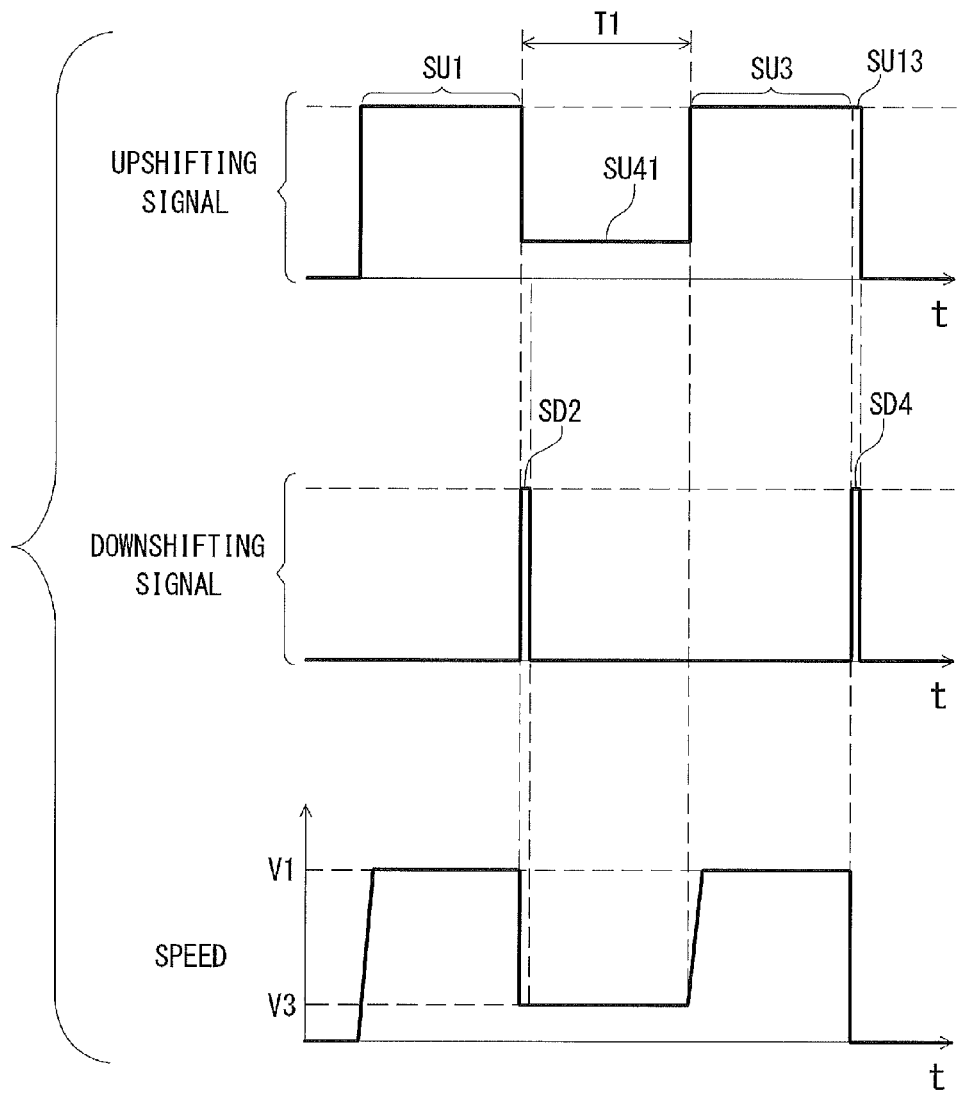
FIG. 18 is a timing chart showing an operation of a bicycle shifting control apparatus in accordance with a fifth embodiment.

As seen in FIG. 18, for example, the transmission controller 514 is configured to generate the downshifting signal SD2 and the upshifting signal SU41 as the temporarily decelerating signal.

With the bicycle shifting control apparatus 512, it is possible to obtain substantially the same advantageous effect as that of the bicycle shifting control apparatus 12 in accordance with the first embodiment.

Sixth Embodiment

A bicycle shifting control apparatus 612 in accordance with a sixth embodiment will be described below referring to FIGS. 6 and 19. Elements having substantially the same function as those in the first embodiment will be numbered the same here, and will not be described and/or illustrated again in detail here for the sake of brevity.

As seen in FIG. 6, the bicycle shifting control apparatus 612 comprises a transmission controller 614. The transmission controller 614 has substantially the same functions as those of the transmission controller 14 in accordance with the first embodiment.

Unlike the transmission controller 14, however, the transmission controller 614 is configured to store the deceleration position defined at a position closer to one of the adjacent two sprockets that to the other of the adjacent two sprockets.

Figure 19:
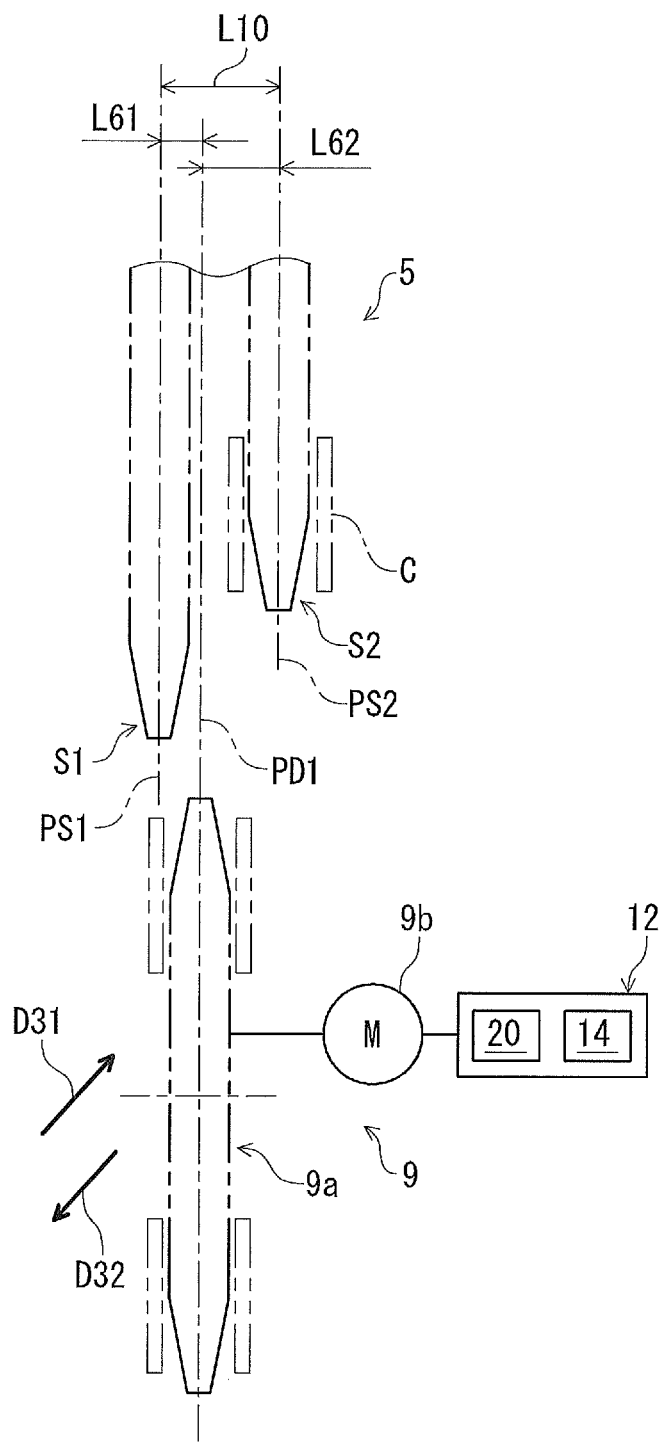
FIG. 19 is a partial schematic view of a sprocket assembly, a derailleur, and a bicycle shifting control apparatus in accordance with a sixth embodiment.

As seen in FIG. 19, for example, a distance L61 between the deceleration position PD1 and the sprocket S1 of the sprocket assembly 5 corresponding to one of the adjacent two shift positions PS1 and PS2 is shorter than the half of the distance L10 between adjacent two sprockets S1 and S2 of the sprocket assembly 5 corresponding to the other of the adjacent two shift positions PS1 and PS2. On the other hand, a distance L62 between the deceleration position PD1 and the sprocket S2 of the sprocket assembly 5 corresponding to the other of the adjacent two shift positions PS1 and PS2 is longer than the half of the distance L10.

The distance L61 is defined between the deceleration position PD1 and an axial center of the sprocket S1 (namely, between the deceleration position PD1 and the shift position PS1) in the axial direction D2. The distance L62 is defined between the deceleration position PD1 and an axial center of the sprocket S2 (namely, between the deceleration position PD1 and the shift position PS2) in the axial direction D2. While FIG. 19 illustrates only a positional relationship between the deceleration position PD1 and each of the sprockets S1 and S2, this positional relationship is applied to other adjacent two sprockets of the sprocket assembly 5.

With the bicycle shifting control apparatus 612, it is possible to obtain substantially the same advantageous effect as that of the bicycle shifting control apparatus 12 in accordance with the first embodiment.

Seventh Embodiment

Figure 20:
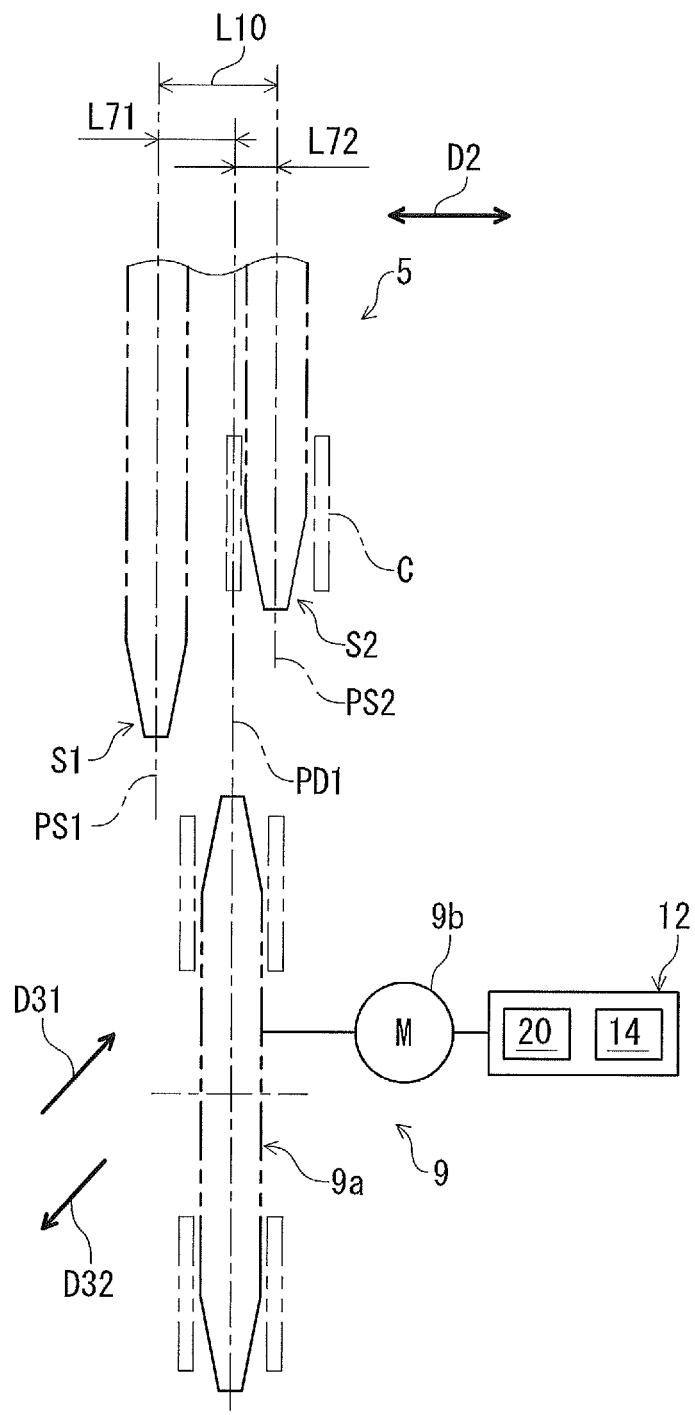
FIG. 20 is a partial schematic view of a sprocket assembly, a derailleur, and a bicycle shifting control apparatus in accordance with a seventh embodiment.

A bicycle shifting control apparatus 712 in accordance with a seventh embodiment will be described below referring to FIGS. 6 and 20. Elements having substantially the same function as those in the first embodiment will be numbered the same here, and will not be described and/or illustrated again in detail here for the sake of brevity.

As seen in FIG. 6, the bicycle shifting control apparatus 712 comprises a transmission controller 714. The transmission controller 714 has substantially the same functions as those of the transmission controller 14 in accordance with the first embodiment.

Unlike the transmission controller 14, however, the transmission controller 714 is configured to store the deceleration position defined at a position closer to one of the adjacent two sprockets that to the other of the adjacent two sprockets as well as the sixth embodiment.

As seen in FIG. 19, for example, a distance L71 between the deceleration position PD1 and the sprocket S1 of the sprocket assembly 5 corresponding to one of the adjacent two positions PS1 and PS2 is longer than the half of the distance L10 between adjacent two sprockets S1 and S2 of the sprocket assembly 5 corresponding to the adjacent two shift positions PS1 and PS2. On the other hand, a distance L72 between the deceleration position PD1 and the sprocket S2 of the sprocket assembly 5 corresponding to the other of the adjacent two positions PS1 and PS2 is shorter than the half of the distance L10.

The distance L71 is defined between the deceleration position PD1 and an axial center of the sprocket S1 (namely, between the deceleration position PD1 and the shift position PS1) in the axial direction D2. The distance L72 is defined between the deceleration position PD1 and an axial center of the sprocket S2 (namely, between the deceleration position PD1 and the shift position PS2) in the axial direction D2. While FIG. 20 illustrates only a positional relationship between the deceleration position PD1 and each of the sprockets S1 and S2, this positional relationship is applied to other adjacent two sprockets of the sprocket assembly 5.

With the bicycle shifting control apparatus 712, it is possible to obtain substantially the same advantageous effect as that of the bicycle shifting control apparatus 12 in accordance with the first embodiment.

The deceleration position (the waiting position) in the upshifting operation can be different from the deceleration position (the waiting position) in the downshifting operation if needed and/or desired. For example, the deceleration position PD1 in accordance with the sixth embodiment can be applied to the downshifting operation of the chain guide 9a while the deceleration position PD1 in accordance with the seventh embodiment can be applied to the upshifting operation of the chain guide 9a.

It will be apparent to those skilled in the bicycle field from the present disclosure that the above embodiments can be at least partially combined with each other. Furthermore, while the bicycle shifting control apparatus in accordance with each of the above embodiments is configured to control the rear derailleur 9, the configurations of the bicycle shifting control apparatus can be applied to a control apparatus configured to control the front derailleur 8 if needed and/or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The term "configured" as used herein to describe a component, section or part of a device includes hardware and/or software that is constructed and/or programmed to carry out the desired function. The desired function can be carried out by hardware, software, or a combination of hardware and software.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:
1. A bicycle shifting control apparatus comprising:
   a transmission controller configured to control a guide actuator of a derailleur to move a chain guide of the derailleur between a plurality of shift positions in response to an input shifting signal, the chain guide being configured to guide a bicycle chain configured to engage with a sprocket assembly including sprockets having a shift assist structure configured to assist a shifting motion of the bicycle chain, the transmission controller being configured to control, in a shifting operation of the chain guide between adjacent two shift positions of the plurality of shift positions, the guide actuator to temporarily decelerate the chain guide at a deceleration position defined between the adjacent two shift positions so that the bicycle chain engages with and/or disengages from one of the sprockets having the shift assist structure prior to completion of the shifting operation of the chain guide.

2. The bicycle shifting control apparatus according to claim 1, wherein the deceleration position is defined at a substantially middle position between adjacent two sprockets of the sprocket assembly corresponding to the adjacent two shift positions.

3. The bicycle shifting control apparatus according to claim 1, wherein the transmission controller is configured to store the deceleration position.

4. The bicycle shifting control apparatus according to claim 3, wherein the transmission controller is configured to store a latest deceleration position inputted from an input device as the deceleration position.

5. The bicycle shifting control apparatus according to claim 1, wherein the transmission controller is configured to store a decelerating time for which the chain guide is temporarily decelerated at the deceleration position in the shifting operation of the chain guide.

6. The bicycle shifting control apparatus according to claim 5, wherein the transmission controller is configured to store a latest decelerating time inputted from an input device as the decelerating time.

7. The bicycle shifting control apparatus according to claim 1, wherein the transmission controller is configured to generate
a first moving signal to move the chain guide in a first shifting direction, and
a second moving signal to move the chain guide in a second shifting direction opposite to the first shifting direction, and the transmission controller is configured to generate a temporarily decelerating signal to temporarily decelerate a movement of the chain guide in the first shifting direction and the second shifting direction.

8. The bicycle shifting control apparatus according to claim 7, wherein the deceleration position includes a waiting position, and
the temporarily decelerating signal including a temporarily stopping signal to temporarily stop the chain guide at the waiting position.

9. The bicycle shifting control apparatus according to claim 8, wherein the transmission controller is configured to generate one of the first moving signal and the second moving signal in response to one of a first input shifting signal and a second input shifting signal so that the chain guide is moved from one of the adjacent two shift positions to the waiting position, the transmission controller is configured to generate the temporarily stopping signal so that the chain guide is stopped at the waiting position, and the transmission controller is configured to generate the one of the first moving signal and the second moving signal so that the chain guide is moved from the waiting position to the other of the adjacent two shift positions.

10. The bicycle shifting control apparatus according to claim 9, wherein the transmission controller is configured to generate one of the first moving signal and the second moving signal so that the movement of the chain guide between the waiting position and one of the adjacent two shift positions is equal to the movement of the chain guide between the waiting position and the other of the adjacent two shift positions.

11. The bicycle shifting control apparatus according to claim 9, wherein the transmission controller is configured to generate one of the first moving signal and the second moving signal so that the movement of the chain guide between the waiting position and one of the adjacent two shift positions is different from the movement of the chain guide between the waiting position and the other of the adjacent two shift positions.

12. The bicycle shifting control apparatus according to claim 9, wherein the temporarily stopping signal includes a braking signal to apply a braking force to the chain guide to stop the chain guide at the waiting position.

13. The bicycle shifting control apparatus according to claim 1, wherein a distance between the deceleration position and a sprocket of the sprocket assembly corresponding to one of the adjacent two shift positions is shorter than or equal to a half of a distance between adjacent two sprockets of the sprocket assembly corresponding to the other of the adjacent two shift positions.

14. The bicycle shifting control apparatus according to claim 1, wherein a distance between the deceleration position and a sprocket of the sprocket assembly corresponding to the one of the adjacent two positions is longer than a half of a distance between adjacent two sprockets of the sprocket assembly corresponding to the adjacent two shift positions.

15. The bicycle shifting control apparatus according to claim 1, wherein a clearance between adjacent two sprockets of the sprocket assembly corresponding to the adjacent two shift positions is less than 2.3 mm.

16. The bicycle shifting control apparatus according to claim 1, wherein the sprocket assembly includes at least eleven sprockets.

17. A bicycle shifting control apparatus comprising:

a transmission controller configured to control a guide actuator of a derailleur to move a chain guide of the derailleur between a plurality of shift positions in response to an input shifting signal, the chain guide being configured to guide a bicycle chain configured to engage with a sprocket assembly including sprockets having a shift assist structure configured to assist a shifting motion of the bicycle chain, the transmission controller being configured to control, in a shifting operation of the chain guide between adjacent two shift positions of the plurality of shift positions, the guide actuator to temporarily stop the chain guide at a waiting position defined between the adjacent two shift positions so that the bicycle chain engages with and/or disengages from one of the sprockets having the shift assist structure prior to completion of the shifting operation of the chain guide.

18. The bicycle shifting control apparatus according to claim 17, wherein
the transmission controller is configured to generate
a first moving signal to move the chain guide in a first shifting direction, and
a second moving signal to move the chain guide in a second shifting direction opposite to the first shifting direction, and
the transmission controller is configured to generate a temporarily stopping signal to temporarily stop a movement of the chain guide in the first shifting direction and the second shifting direction.

19. The bicycle shifting control apparatus according to claim 18, wherein
the transmission controller is configured to generate one of the first moving signal and the second moving signal in response to one of a first input shifting signal and a second input shifting signal so that the chain guide is moved from one of the adjacent two shift positions to the waiting position,
the transmission controller is configured to generate the temporarily stopping signal so that the chain guide is stopped at the waiting position, and
the transmission controller is configured to generate the one of the first moving signal and the second moving signal so that the chain guide is moved from the waiting position to the other of the adjacent two shift positions.

20. The bicycle shifting control apparatus according to claim 19, wherein
the transmission controller is configured to generate one of the first moving signal and the second moving signal so that the movement of the chain guide between the waiting position and one of the adjacent two shift positions is equal to the movement of the chain guide between the waiting position and the other of the adjacent two shift positions.

21. The bicycle shifting control apparatus according to claim 19, wherein
the transmission controller is configured to generate one of the first moving signal and the second moving signal so that the movement of the chain guide between the waiting position and one of the adjacent two shift positions is different from the movement of the chain guide between the waiting position and the other of the adjacent two shift positions.

22. The bicycle shifting control apparatus according to claim 19, wherein
the temporarily stopping signal includes a braking signal to apply a braking force to the chain guide to stop the chain guide at the waiting position.

23. A method of controlling a derailleur, comprising:
moving a chain guide of the derailleur between a plurality of shift positions in response to an input shifting signal, the chain guide being configured to guide a bicycle chain configured to engage with a sprocket assembly including sprockets having a shift assist structure configured to assist a shifting motion of the bicycle chain; and
decelerating the chain guide temporarily, in a shifting operation of the chain guide between adjacent two shift positions of the plurality of shift positions, at a deceleration position defined between the adjacent two shift positions so that the bicycle chain engages with and/or disengages from one of the sprockets having the shift assist structure prior to completion of the shifting operation of the chain guide.

24. A method of controlling a derailleur, comprising:
moving a chain guide of the derailleur between a plurality of shift positions in response to an input shifting signal, the chain guide being configured to guide a bicycle chain configured to engage with a sprocket assembly including sprockets having a shift assist structure configured to assist a shifting motion of the bicycle chain; and
stopping the chain guide temporarily, in a shifting operation of the chain guide between adjacent two shift positions of the plurality of shift positions, at a waiting position defined between the adjacent two shift positions so that the bicycle chain engages with and/or disengages from one of the sprockets having the shift assist structure prior to completion of the shifting operation of the chain guide.

* * * * *